United States Patent
Moola et al.

(10) Patent No.: US 10,204,527 B2
(45) Date of Patent: Feb. 12, 2019

(54) SYSTEMS AND METHODS FOR DETERMINING MISSION READINESS

(71) Applicant: Visual Awareness Technologies & Consulting, Inc., Tampa, FL (US)

(72) Inventors: Sara Moola, Tampa, FL (US); Robert Michael Vaughn, Tampa, FL (US)

(73) Assignee: Visual Awareness Technologies & Consulting, Inc., Tampa, FL (US)

( * ) Notice: Subject to any disclaimer, the term of this patent is extended or adjusted under 35 U.S.C. 154(b) by 0 days.

(21) Appl. No.: 15/498,307

(22) Filed: Apr. 26, 2017

(65) Prior Publication Data

US 2017/0309198 A1    Oct. 26, 2017

Related U.S. Application Data

(60) Provisional application No. 62/327,715, filed on Apr. 26, 2016.

(51) Int. Cl.
| | |
|---|---|
| G09B 5/12 | (2006.01) |
| G09B 9/00 | (2006.01) |
| G06Q 50/00 | (2012.01) |
| G06Q 50/26 | (2012.01) |
| G09B 29/00 | (2006.01) |
| G06F 17/30 | (2006.01) |
| G06K 9/00 | (2006.01) |

(52) U.S. Cl.
CPC ....... *G09B 9/003* (2013.01); *G06F 17/30241* (2013.01); *G06F 17/30867* (2013.01); *G06F 17/30994* (2013.01); *G06K 9/0063* (2013.01); *G06K 9/00342* (2013.01); *G06K 9/00744* (2013.01); *G06K 9/00771* (2013.01); *G06K 9/00892* (2013.01); *G06Q 50/01* (2013.01); *G06Q 50/26* (2013.01); *G09B 29/007* (2013.01)

(58) Field of Classification Search
CPC ................................. G09B 9/003; G09B 5/12
USPC .......................................................... 434/11
See application file for complete search history.

(56) References Cited

U.S. PATENT DOCUMENTS

| | | | |
|---|---|---|---|
| 2011/0280453 A1 | 11/2011 | Chen et al. | |
| 2012/0208152 A1* | 8/2012 | Stacy | G06F 17/5009 434/188 |
| 2015/0024353 A1* | 1/2015 | Chesnutt | G09B 19/00 434/219 |

* cited by examiner

*Primary Examiner* — Thomas Hong
(74) *Attorney, Agent, or Firm* — Venable LLP; Jeffri A. Kaminski

(57) ABSTRACT

The present invention is directed to systems and methods for objectively assessing mission readiness. The systems can comprise a backend system and scenario server in communication with the backend system. The backend system can comprise a planning and analysis system comprising planning and/or assessing data for one or more training missions, a common database builder comprising geographical data of a geographical region for the training mission, and a digital media replicator comprising a social media module configured to receive publically accessible data relevant to the training mission from one or more social media platforms. The scenario server is configured to receive data from each of the planning and analysis system, common database builder, and digital media replication to create the training mission. Methods in accordance with such systems are disclosed herein.

13 Claims, 20 Drawing Sheets

FIG. 2

| Input | Process | Output |
|---|---|---|
| Resources<br>Costs | Training<br><br>Courses<br>Events<br>Exercises<br>OPTEMPO<br>Accomplishments | Performance<br><br>Measures of effectiveness<br>Exercise outcomes<br>Performance to standards<br>Training readiness |
| Programmed/Actual<br>Current and Future | Programmed/Actual<br>Current and Future | Programmed/Actual<br>Current and Future |

FIG. 8

SYSTEMS AND METHODS FOR DETERMINING MISSION READINESS

CROSS REFERENCE TO RELATED APPLICATION

The present application claims benefit of U.S. Provisional Application Ser. No. 62/327,715, filed on Apr. 26, 2016, the entire content of which is incorporated by reference herein in its entirety.

TECHNICAL FIELD

The present invention relates to systems and methods for determining mission readiness of one or more users, and more particularly, for doing so in a risk environment such as a military operation.

BACKGROUND

In operations in Iraq, Afghanistan, and elsewhere, there is a failure to recognize, acknowledge, and accurately define the operational environment of conflict zones. Along these lines, there is also a lack of understanding of how to define mission readiness of the joint forces—partner nations, industries, non-profits and government agencies with underlying missions of promoting stability and economic development—units placed in their respective zones to mitigate conflict. This leads to a mismatch between forces, capabilities, missions, and goals.

To determine mission readiness, planners must identify their audiences' composition and equipment, objectives, target OE, and critical events within scenarios to determine proficiency in real world missions. Trainers must then overlay these design parameters onto their organizational resources. This step requires determining how best to replicate the physical and human terrains of the real world OE in order to achieve mission objectives.

However, current systems are incapable of providing realistic training environments for users that share a common geodatabase. Furthermore, current systems do not possess intelligence or operations assessment methodology on quantifiable data gathered from live execution, nor do they gather data from the replicated operational environment to allow assessment of mission readiness.

As such, there is a need for systems and methods that provide a geospatially enabled and shared exercise environment which renders a simulation of multi-disciplinary intelligence feeds and analysis including, but not limited to, human dynamics and geophysical characteristics of the region of interest. Embodiments of the present invention provide such systems and methods.

BRIEF SUMMARY OF THE INVENTION

The present invention is directed to systems for determining mission readiness with map based mission readiness indicators, the systems comprising a server assist in the design of mission training scenario and is configured to store one or more training missions and a backend system in communication with the server and configured to assist in creating the training mission. The systems can also comprise one or more computing devices for exercise participants and planners.

The backend system can comprise a common database builder and a digital media replicator, as well as an optional planning and analysis system. The common database builder comprises geographical data, and can comprise a plurality of levels of detailed structure of such geographical data and includes both a map display module and distribution module. The map display allows constant updates of the geospatial data as well as the exercise data (ex. Geographic updates of participating entities in exercise and respective status) overlaid on map. The distribution module captures or geo-harvests all conflict area specific data and assures all geographic data including video and forensics is distributed in sync with the mission (ex. The mission rehearsal simulators receive the same secure and user permitted data as the mission planning and common operational picture). The digital media replicator comprises a social media module, and can also comprise a news sites module and/or an objective module. The social media module can receive data relevant to the training mission from one or more social platforms, such as Facebook, Twitter, YouTube and Tencent QQ. The news sites module can receive data relevant to one the training mission from one or more news sites. The objective module can receive data related to one or more objectives of the training mission from one or more external sources including drone captured video links and forensics data for identifying and verifying target. The planning and analysis system is the backbone of the system which allows all detail of the mission scenario and logistical support to be captured throughout the development/life cycle of the exercise; if adequately populated with the data necessary, the PAS can determine the realism of the mission exercise and the assess the performance of all participants and planners in the mission exercise.

The data and methods used in each exercise are stored and used in an intelligence module and an analysis module. The intelligence module learn from the training mission to improve one or more future training missions. The analysis module present a report of a performance of both the exercise realism and the mission readiness assessment of all role players in the training scenario, allowing the exercise to become more 'real' and the performer to become more 'mission ready'.

BRIEF DESCRIPTION OF THE DRAWINGS

The features and advantages of the invention will be apparent from the following drawings wherein like reference numbers generally indicate identical, functionally similar, and/or structurally similar elements.

In the drawings:

FIG. 2 illustrates an exemplary profile of a target participating entity in a training mission in accordance with embodiments of the present invention;

FIG. 8 illustrates exemplary data processed by a planning and analysis system in accordance with embodiments of the present invention;

DETAILED DESCRIPTION OF THE PRESENT INVENTION

Reference will now be made in detail to various embodiments of the present invention, examples of which are illustrated in the accompanying drawings. It is to be understood that the figures and descriptions of the present invention included herein illustrate and describe elements that are of particular relevance to the present invention. It is also important to note that any reference in the specification to "one embodiment," "an embodiment" or "an alternative embodiment" means that a particular feature, structure or characteristic described in connection with the embodiment is included in at least one embodiment of the invention. As such, the recitation of "in one embodiment" and the like throughout the specification do not necessarily refer to the same embodiment.

The systems disclosed herein are intended to determine mission readiness of one or more participating entities, particularly in a hostile environment. As such, although the systems disclosed herein are intended to be utilized in a military operation, they can also be utilized in other risk environments including, but not limited to, a gas and oil operation, a coal mining operation, a medical operation, etc.

To determine mission readiness, the systems disclosed herein provide a training environment platform to determine mission readiness of a participating entity. The training environment platform can provide a geospatial stimulation with real-time cyber information including, but not limited to, social media, criminal, and financial information. As such, the training environment platform can incorporate real-life and synthetic information to provide a more realistic environment, thereby allowing mission readiness to be more realistically determined.

The term "participating entity" used herein can refer to any participant in the training exercise. The participant can be real or fictitious. Along these lines, the participant can be on a team of a role player, or on a team opposing the role player, in the training exercise. As such, the participating entity can be a target for a player.

The term "role player" used herein can refer to a real-life player who assumes the role of a participating entity in the training exercise.

Figure 1:
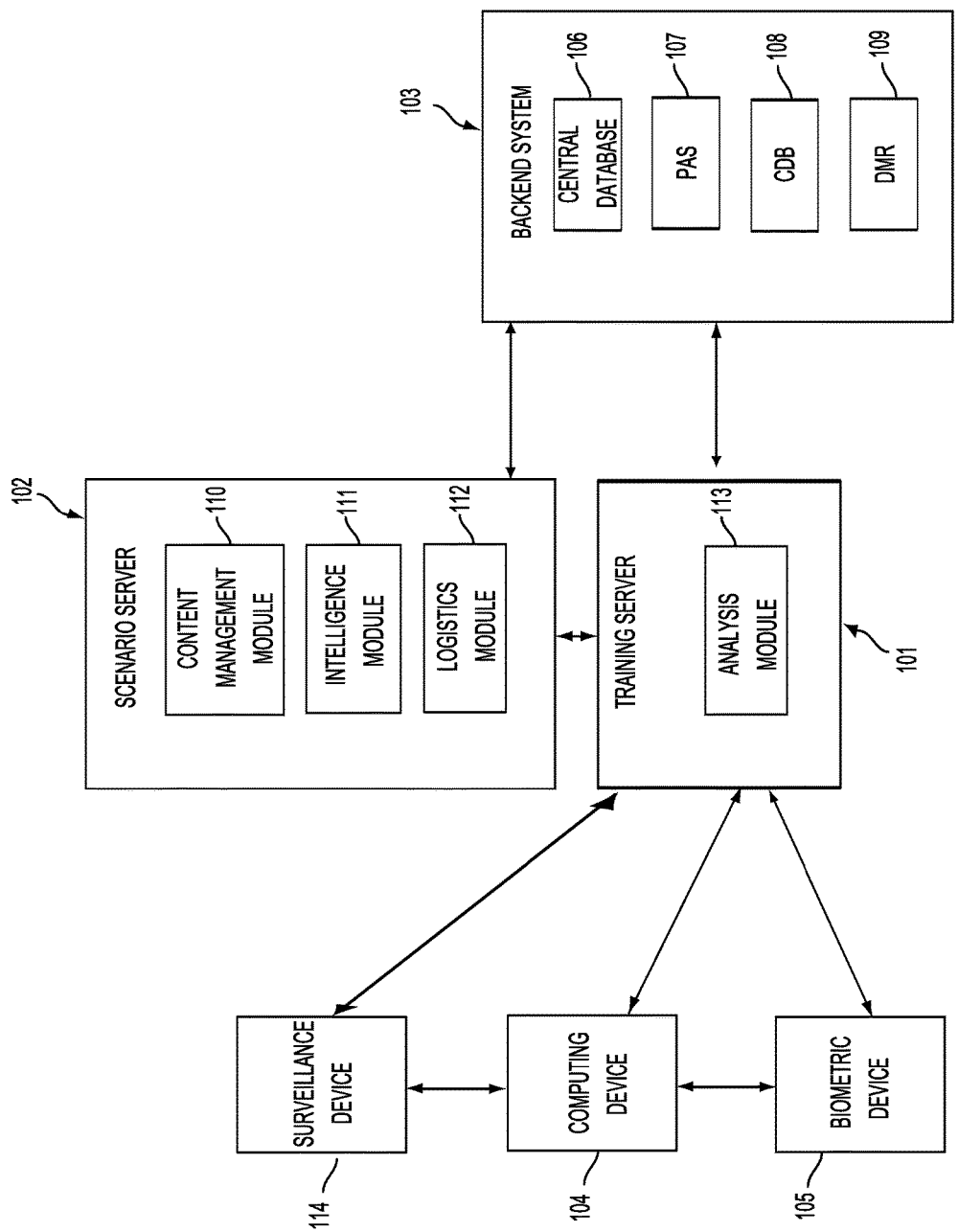
FIG. 1 illustrates an exemplary system for determining mission readiness in accordance with the embodiments of the present invention.

Referring now to the figures, various exemplary embodiments of systems for determining mission readiness and methods thereof will be described. Referring to FIG. 1, an exemplary system 100 for determining mission readiness of one or more participating entities is provided. The system 100 can include a training server 101, a scenario server 102, a backend system 103, one or more computing devices 104, one or more biometric devices 105, and a surveillance device 114.

The training server 101 can provide one or more training missions to assess the mission readiness of one or more participating entities. To do so, the training server 101 is in communication with the computing device 104. The computing device 104 can belong to a participating entity, planner, or audience member. Exemplary computing devices include, but are not limited to, a desktop computer, a portable computer, a laptop computer, a tablet computer, a smartphone, a smartwatch, etc. According to one embodiment, the computing devices 104 can allow the planners to communicate with each other and/or the participating entities, and not to permit the audience members to communicate with the planners and/or participating entities. According to another embodiment, the computing device can allow the planners and/or audience members to communicate with each other and/or the participating entities.

The computing device 104 can require login credentials to be inputted. The login credentials for the participating entities, planners, and audience members can be unique to each user. As such, the login credentials can be preselected and provided thereto. The login credentials can also be inputted via a finger print or in another form of biometric identity. Moreover, the login credentials can be linked to a social media platform (i.e., Facebook®, Twitter®, YouTube®, and Tencent QQ®) and can, therefore, be the same as the log-in credentials of the social media platform.

Upon logging in, the training server 101 can permit the planners and/or audience members to assign a training mission to the participating entities, and/or can permit the participating entities to select a training missions to partake in. Along these lines, the training mission can be based one or more of: the geographical location of the participating entities, the geographical location of the planners, and the geographical location of the training mission. According to an embodiment, the training server 101 can allow participating entities, planners, and/or audience members to select a training mission and, thereafter, present one or more objectives and/or geographical locations. According to another embodiment, the training server 101 can allow participating entities, planners, and/or audience members to select an objective and, therefore, present one or more training missions and corresponding geographical locations. According to yet another embodiment, the training server 101 can allow participating entities, planners, and/or audience members to select a geographical location and, thereafter, present one or more objectives and training missions.

The training mission can be based on one of a plurality of script. As such, the training mission can comprise one or more geographical locations, scenarios, objectives, and tasks. The geographical location can relate to a point of interest in fulfilling one or more stages of the training mission. The scenario can relate to a setting for a role player or a team of the role player to perform the training exercise. The training exercise can comprise a plurality scenarios. Moreover, the objective can relate to an ultimate goal for a role player or a team of the role player in the training mission, such as capturing one or more target individuals, and can require completion of said in a period of time. The task can relate to one or more goals for a role player or a team of the role player in accomplishing the objective in the training mission. The objective can include a plurality of tasks. As such, the scenarios and/or objectives can be the same or different for each participating entity, and can be based on a role of the participating entity in the training mission (i.e., snipers, pilots, etc.). Moreover, the scenarios and/or objectives can be created, selected, and/or modified by a user via a planning and analysis system, as will be discussed in more detail below.

The objective for a training mission can be capturing a target participating entity. As such, a profile of the target participating entity can be presented to the audience members, role players, and/or planners on the computing device 104. The profile can be a verbal or written summary of the target participating entity, and can include a set of characteristics of the target participating entity that are pertinent to the training exercise. As such, the profile can include one or more attributes of the target participating entity, such as, but not limited to, a name, an image, last known presence, tendencies, criminal charges, and reasons for capture of the target participating entity.

Figure 2:
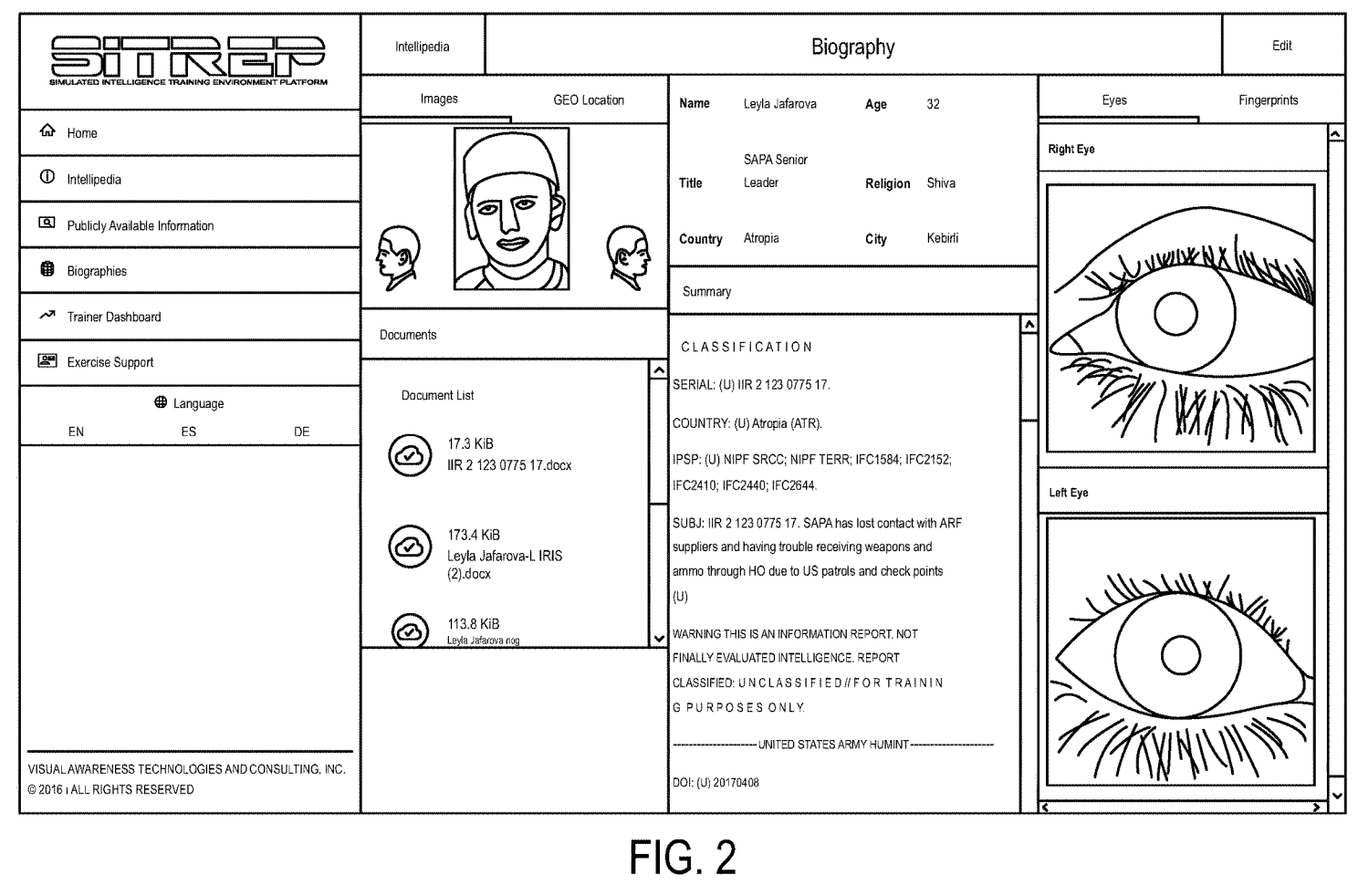

Referring now to FIG. 2, an exemplary profile of a target participating entity is presented. The profile can comprise a name, an age, a title, a religion, a country, and a city of the target individual. The profile can also include a classification schedule of the target participating entity. The profile can further include an image and forensic information of the target participating entity. The forensic information can include information, such as images, of at least one of an eye and fingerprint of the target participating entity.

Referring back to FIG. 1, the training server 101 can send geospatial data to the computing device 104 for presenting a geographical area in the training mission to the audience members, participating entities, and/or planners on the computing device 104. The geospatial data can be received from the common database builder (CDB) 108 of the backend system 103, and/or from the surveillance device 114, as will be discussed in more detail below. The geographical area presented on the computing device 104 can be two- or three-dimensional.

Figure 3:
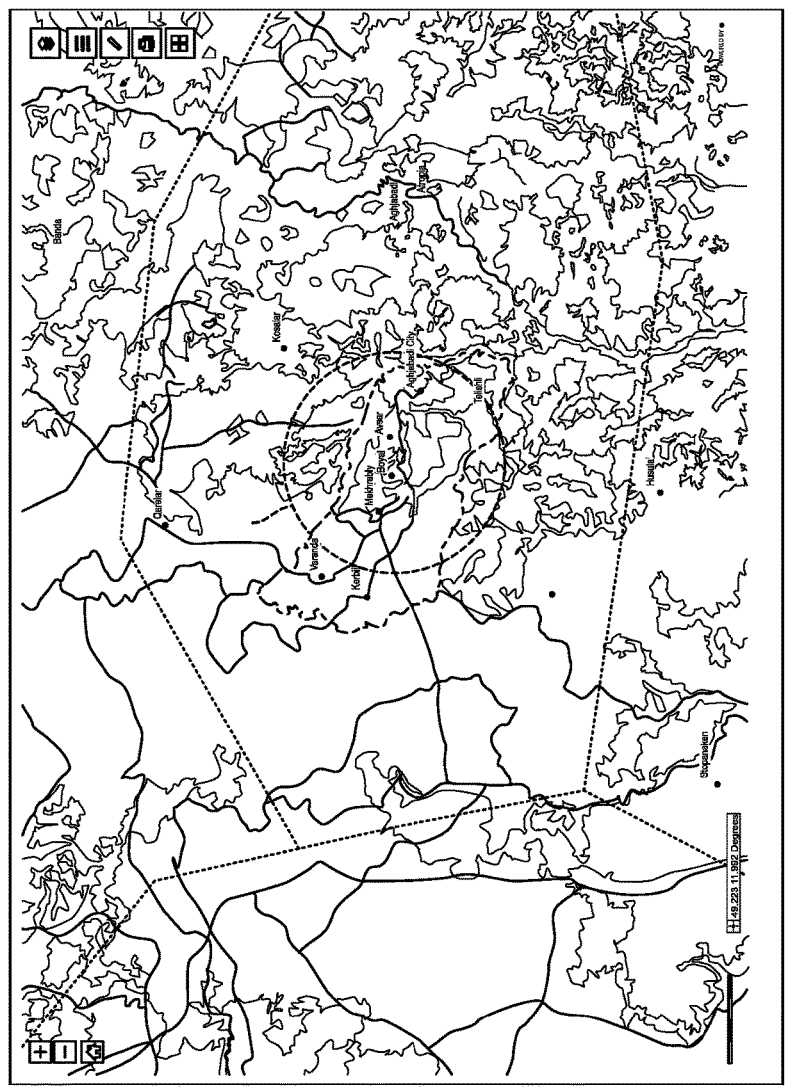
FIGS. 3-6 illustrate exemplary views of a training mission on a computing device in accordance with embodiments of the present invention.

Referring now to FIG. 3, an exemplary view of geographical region of interest in a training mission presented by the computing device is depicted. The view of the geographical region of interest can include diagrammatic representation of an area of land and/or sea, and can show physical features, cities, roads, people, etc. The computing device 104 (illustrated in FIG. 1) can permit a user to zoom in and/or out and navigate around a particular geographical regions of interest. To do so, as illustrated, a user can encircle a particular geographical region of interest in a view of a geographical region of interest. Conversely, a user can click on a particular geographical region of interest in a view of a geographical region of interest.

Figure 4:
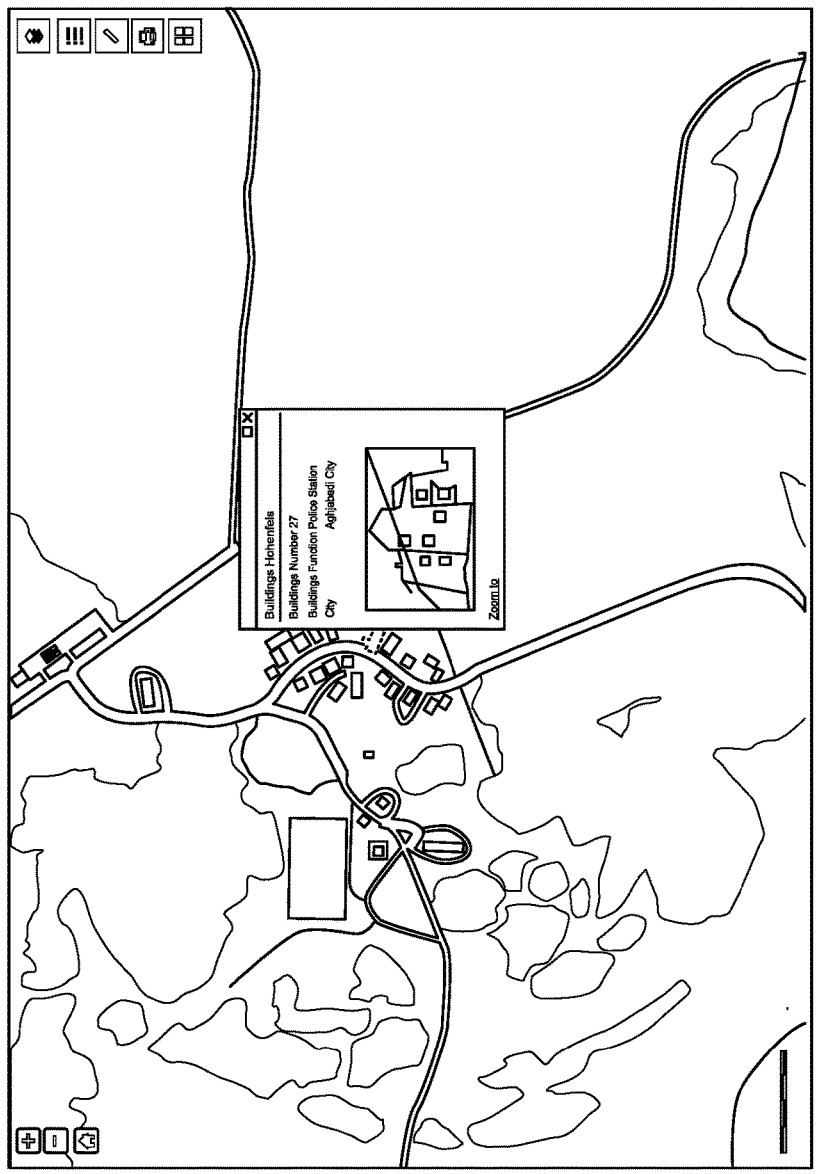

Referring now to FIG. 4, an exemplary view of a particular geographical region of interest selected by a user is presented. The view depicted in FIG. 4 is of a specific geographical area within the view depicted in FIG. 4. In a view presenting detailed structure, as illustrated in FIG. 4, the user can select an item and information pertaining to the item can be displayed. As illustrated, the item can be a building. Alternatively, the item can be a person (i.e., a target), a road, a body of water, etc. The information pertaining to the item can include identification of the item and a more detailed image of the item. As illustrated, the information pertaining to a selected building can include the name of the building name (i.e., Hohenfels), a building number (i.e., 27) a function of the building (i.e., Police Station), and a location of the building (i.e., Aghjabadi City).

Referring back to FIG. 1, the computing devices 104 of the role players, planners, and/or audience members can track the movements and/or locations of the participating entities. Along these lines, the computing devices 104 of the role players, planners, and/or audience members can monitor the status of the role players in the training mission. As such, the computing devices 104 can comprise an alert module for indicating an event in the training mission. According to an embodiment, the participating entities can communicate with a planner for an appropriate action to an event in the training mission. According to another embodiment, the planner, audience member, and/or participating entity can receive notification of an event in the training mission.

Figure 5:
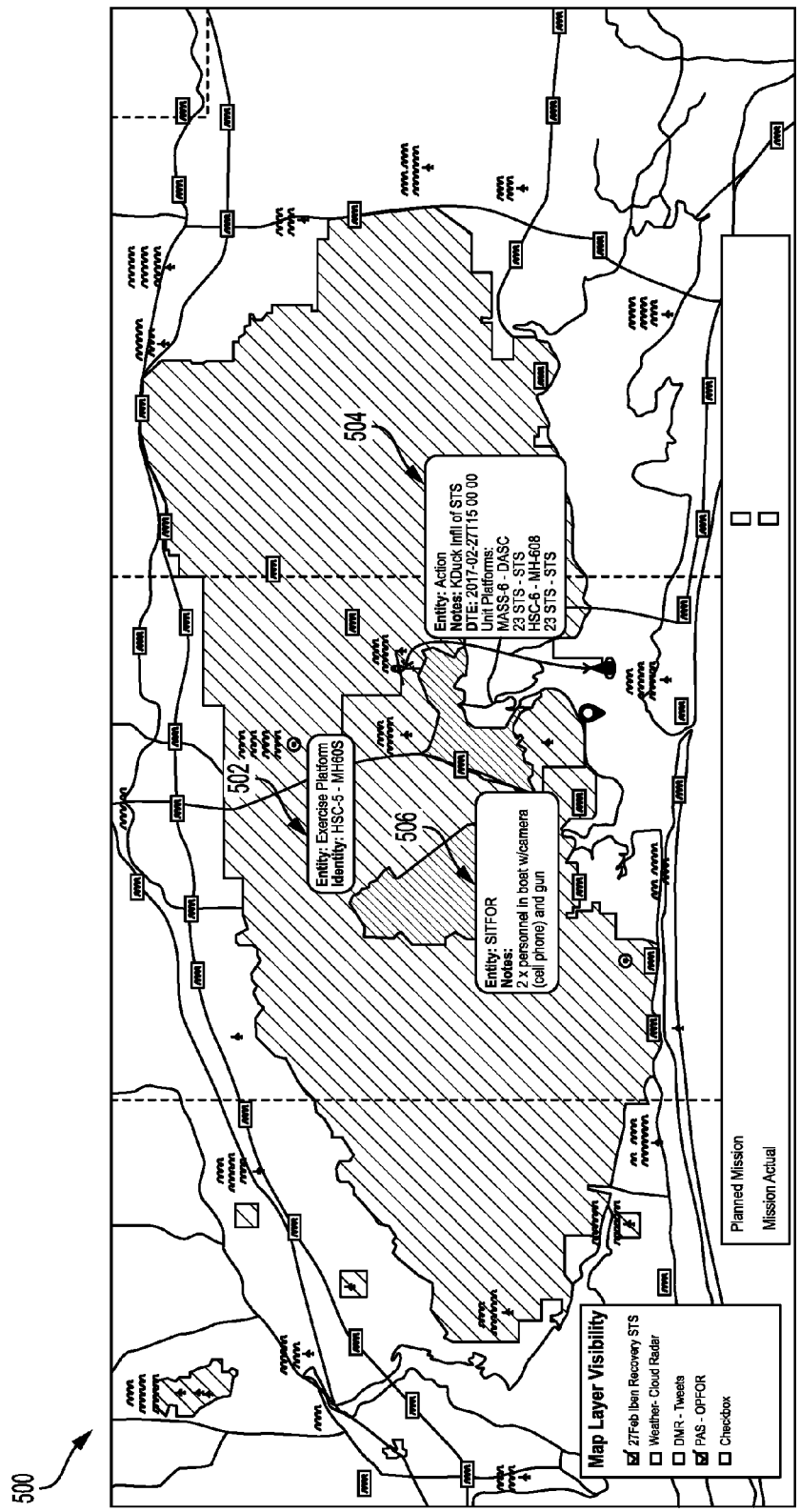

Referring now to FIG. 5, an exemplary view 500 of a plurality of participating entities 502, 504, 506 in a training exercise on a computing device tracking the participating entities is presented. As such, the view 500 is presented on a map of a geographical region of interest. Moreover, the view 500 illustrates a first role player 502, a second role player 506, and a target 504 for the first and second role players 502 and 506. The first role player 502 is a Helicopter Sea Combat Squadron FIVE (HSC-5), which is a s helicopter squadron of the United States Navy based at Naval Station Norfolk operating the Sikorsky MH-60S Seahawk. The second role player 506 include a boat having two personnel with cameras and guns. The target 504 is a 23rd Special Tactics Squadron (23rd STS) and a HSC-5. As shown, the first and second role players 502, 506 are approaching the target 506.

Figure 6:
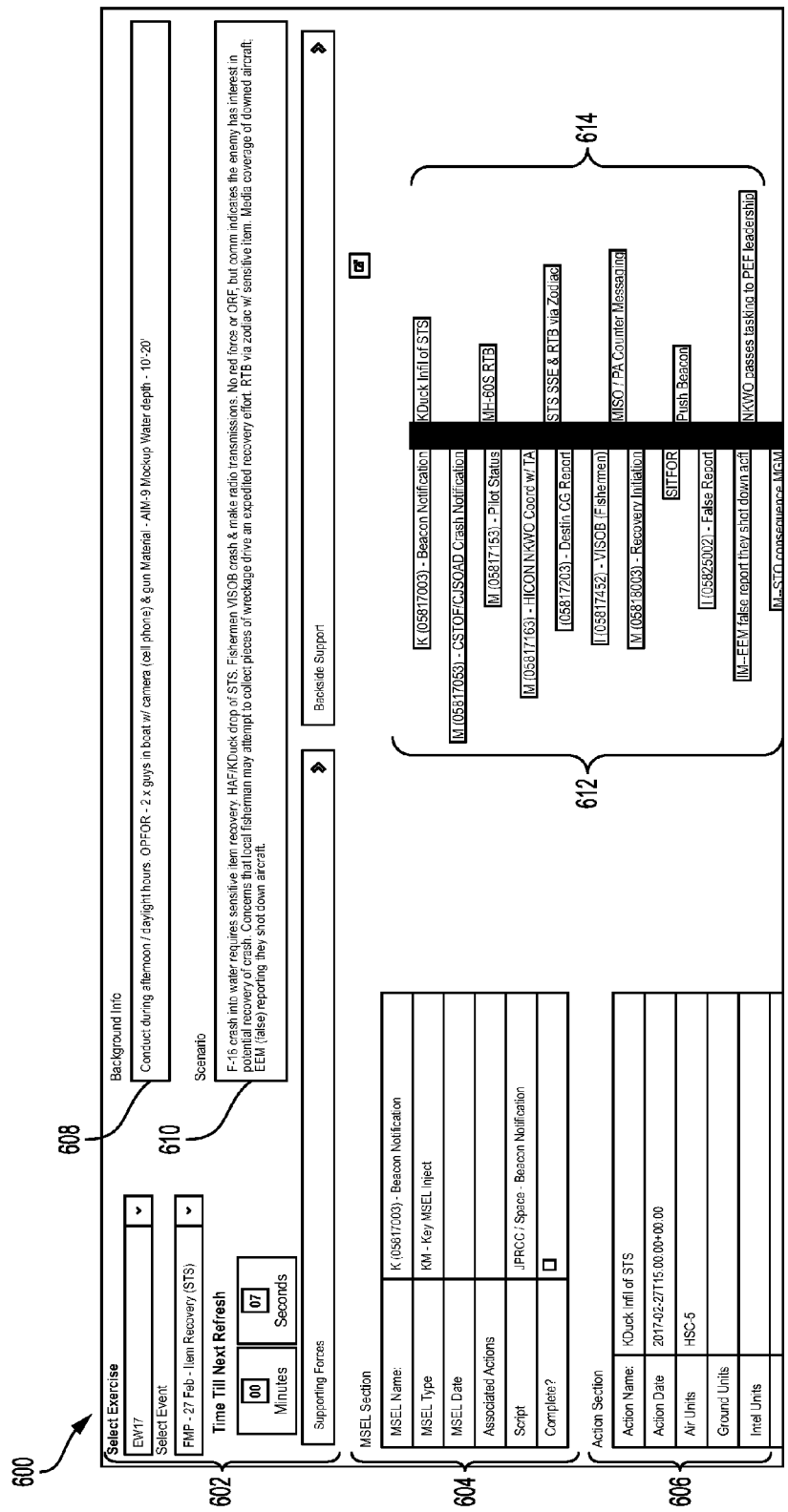

Referring now to FIG. 6, an exemplary view 600 of progress of one or more role players in a training mission on a computing device is depicted. The computing device can present an exercise section ("Select Exercise") 602, a master scenario event list ("MSEL Section") 604, an action section 606, background information section ("Background Info") 608, a scenario information section ("Scenario") 610, and a progress time line 612, 614. The exercise section 602 can include one or more of an identity of the training exercise, an identity of an event in the training exercise, and a refresh countdown until the progress of the role players is updated. The master scenario event list 604 can include one or more of a scenario name ("MSEL Name"), a scenario type ("MSEL Type"), scenario data ("MSEL Data"), actions associated with the scenario ("Associated Actions"), a script of the training exercise ("Script"), and a complete notification ("Complete?") indicating whether the scenario is complete. The action section 606 can include an action name ("Action Name"), an action data ("Action Data"), air units ("Air Units"), ground units ("Ground Units"), and intelligent units ("Intel Units"). The background section 608 can include a short summary of the background of the training mission. The scenario section 610 can a short summary of the background of the scenario of the training mission. The progress timeline 612, can include a timeline of scenario events 612 and a timeline of action events 614. The timeline of scenario events 612 and timeline of actions 614 can be presented to illustrate to a user accomplishment of the role player or the team of the role player. Along these lines, the accomplishment of the role player or the team of the role player can be presented by green, yellow, red. Green illustrating successful completion. Yellow illustrating in progress. Red illustrating a failed attempt.

Referring back to FIG. 1, the training server 101 and/or computing device 104 can be in communication with the biometric device 105 belonging to the role players. The biometric device 105 can monitor one or more biometric properties of the role players and send such information to the training server 101. The biometric properties of the role players may be displayed to the planners, audience members, and/or role players. The biometric properties can include stress, active heart rate, resting heart rate, blood flow, blood pressure, blood oxygen, respiration rate, skin temperature, pulse rate velocity $V_{O2}$ max, steps, Electroencephalogram data, etc. The biometric device 105 can be the same as the computing device 104 (i.e., smart watch).

In order to present the training mission, the training server 101 can be in communication with the backend system 103. The backend system 103 can comprise a central database 106, a planning and analysis system (PAS) 107, a common database builder (CDB) 108, and a digital media replicator (DMR) 109. The PAS 107, CDB 108, and DMR 109 are separate components and can in communication with the training server 101 and each other.

Figure 7:
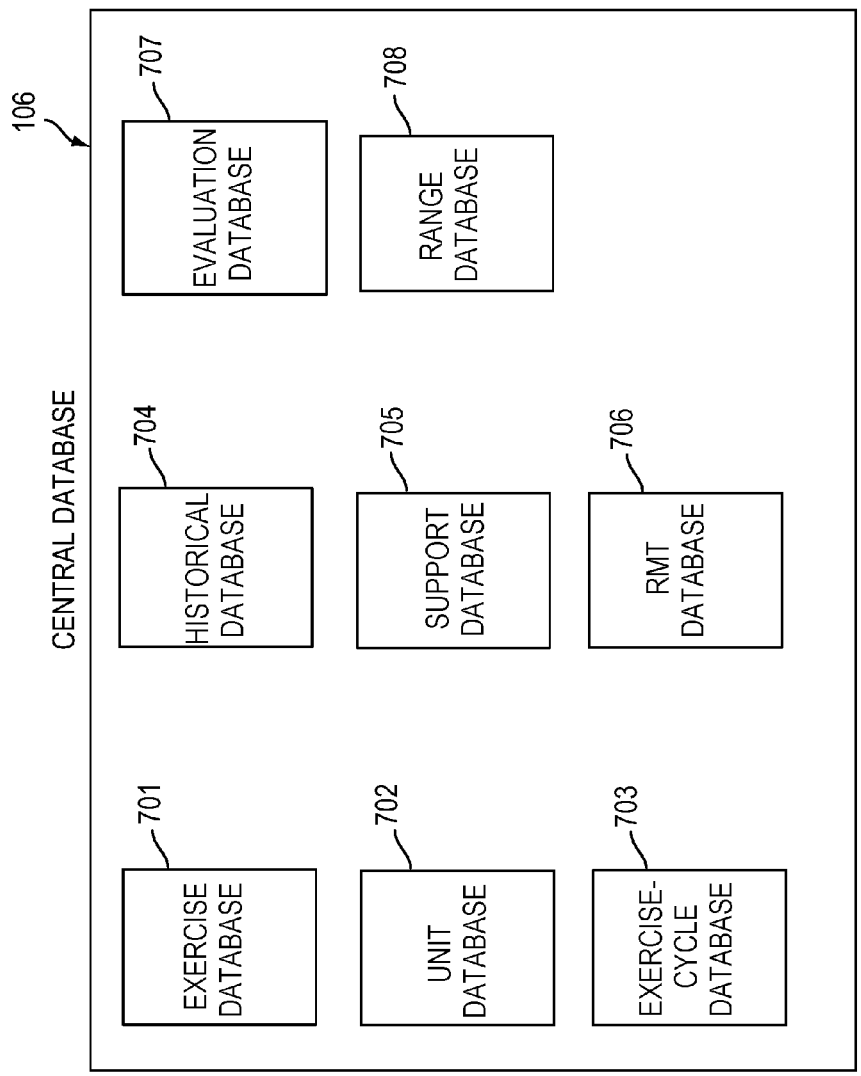
FIG. 7 illustrates an exemplary central database for storing information relating to a training mission in accordance with embodiments of the present invention.

Referring now to FIG. 7, an exemplary central database 106 is provided. The central database 106 can comprise data relating to fulfilling or operating the training mission. As such, the central database 106 can comprise one or more of an exercise database 701, a nit database 702, an exercise-cycle database 703, a historical database 704, a support database 705, a RMT database 706, an evaluation database 707, and an After Action Report (AAR) database 708. The data received from a plurality of these databases can originate from different sources, and thus, may be in different formats. As such, to provide a common format, the central database 106 may utilize a common database processor to translate the data formats into a common database format for use within a single simulator or across a family of simulators. Moreover, one or more of these databases can be loaded, modified, and/or updated by a user (i.e., a subject matter expert, a designer, or a planner).

The exercise database 701 can include data related to one or more geographical regions of interest gathered from a user including, but not limited to, geographical data and cultural data. This includes one or more geographical data of a particular geographical region, cultural data of the geographical region, intelligence gathered by a participating entity in a previous training missions, and additional data inputted by a user (i.e., a subject matter expert, a designer, or a planner) for the geographical region.

The nit database 702 can comprise data of a participating entity received during transmission of a training exercise. Exemplary data includes, but is not limited to, a location of a participating entity, a movement of a participating entity, and human attribute information gathered by sensors of devices worn by participating entities in the training exercise. The data can be received during or after the transmission of the training exercise.

The exercise-cycle database 703 can comprises data received from the training exercise to determine a status of a role player or a team of the role players in the training mission. Exemplary data can include biometrics of the role player or a team of the role player, information of the geographical location, techniques used by the role player or a team of the role players, strategies used by the participants, tactics used by the role player or a team of the role players, etc. As such, the exercise-cycle database 703 determine if the role players are mission ready.

The historical database 704 can include historical data from one or more prior raining exercises. This including assessing data and planning data.

The support database 705 can include any data supporting one or more training missions including, but not limited to, information from one or more websites, foreign translation, human attribution information, forensic data. According to an embodiment, the support data can include or more related document(s), name, age, title, religion, country, city and a summary of the potential target individual.

The Realistic Military Training (RMT) database 706 can include data specific to the scenario in order to make the training mission more realistic. Exemplary data includes injured civilians, opposing forces, and drone fleets, as well as locations of safe houses and helicopter landing zones. Exemplary data also includes linguistic tools (i.e., translator tools) and cultural data. As such, the data from RMT database 706 can be utilized to create an ideal training mission from past training mission supported in the same area or similar vein.

The AAR database 708 can compile the data from one or more reports. The data can be grouped according to each participating entity, each group of participating entities, each training mission, etc.

Referring back to FIG. 1, the PAS 107 can assist in developing one or more training missions, objectives for each training mission, and/or scenarios for each training mission. The PAS 107 can also assist in determining a performance of a role player or a group of the role player in the training mission during and/or after a training mission. To do so, the PAS 107 can receive planning data and/or assessing data from a user (i.e., a subject matter expert, a designer, a planner). To receive the planning and assessing data, the PAS can provider a user with a systemic approach. For instance, the PAS 107 can provide a user with a number of selection for appropriate data to be inserted. As such, the PAS 107 can control the type of data the user is inputting.

The planning data can include one or more of a target individual, an objective, a scenario, a task, a time, a place, and a weather condition. Along these lines, the planning data can also include one or more of equipment accessible to participating entities, a number of participating entities in the training mission, a type of each participating entity in the participating entity (i.e., snipers, ground troops, spies, etc.), and a type of terrain in a geographical region of the participating entity. Moreover, the planning data can include geospatial data from the CDB 108, as will be discussed in more detail below. As such, the planning data can be the same or different for various geographical regions and for participating entities (i.e., snipers, ground troops, spies).

The assessing data can include one or more parameters and/or standards to determine a performance of the a role player or a group of the role player in one or more training mission, including those related to biometrics of the role player or a group of the role player in the training mission. Accordingly, the parameters and/or standards can be the same or different for each training mission. For instance, the parameters and/or standards can be based on the geographical location of the simulated training mission, the objectives of the training mission, the target individual in the training mission, and the role of the role player in the training mission.

Along these lines, the PAS 107 can determine a training exercise from a limited input provided by a user. Reaming now to FIG. 8, a diagram of exemplary data that can processed by the PAS is illustrated. The user can input available resources and costs for implementing a training exercise. Based on the input, the PAS can determine the process of implementing the training exercise and the output that can provided by the system. As shown the PAS can determine the training exercise that can be implemented, as well as the courses, events, exercises, operations tempo ("OPTEMPO"), and accomplishments for the training exercise. The PAS can also determine how to analyze performance. Specifically, the PAS can determine how to measure effectiveness and exercise outcomes, as well as the performance standards to do so, in order to determine training readiness.

Referring back to FIG. 1, upon receiving planning and assessing data, the PAS 107 can update the databases of the central database 106 discussed above. Moreover, the PAS can determine if the received planning and assessing data is sufficient to create the training mission. Upon sufficient planning and assessing data, the PAS 107 can create a data model comprising a plurality of element for the training mission. In doing so, the PAS 107 can determine the relationships between the elements for the training mission. The relationships can be based on the goals of the training mission (e.g. target individual, an objective, a scenario, a task, etc.) and the geographical location of the training mission.

Upon creating the data model, the PAS 107 can transmit the data model to an artificial intelligence system, such as IBM® Watson. The artificial intelligence system can interrogate the data of the data model and, if necessary, assign spatial attributes. By doing so, the artificial intelligence system can return non-georeferenced data along with the original data to the PAS 107 and georeferenced data corresponding to the data model to CDB 108. Thereafter, if appropriate, the PAS 107 can updates the data model from the artificial intelligence system and send it to the scenario server 102. Along these lines, the PAS 107 can also receive updates from the intelligence module 111 upon operation of the training mission, which will be discussed in more detail below.

Moreover, the PAS 107 be in communication with the DMR 109 to analyze PAI stored in the DMR 109 that relates to a goal of a training mission, such as capturing a target individual. In doing so, the PAS 107 can also provide an analytics dashboard comprising a graph illustrating an amount of traffic to one or more of websites, news feeds, and/or social media relating to a target individual over a period of time. The traffic monitored and may pulled may be unique visits and/or page views of the individual. The period of time can be over a course of a day, a month, or a year. The analytics dashboard can also present comprise one or more graphs of more detailed information of websites, news feeds, and/or social media relating to the target individual over the period of time.

Figure 9:
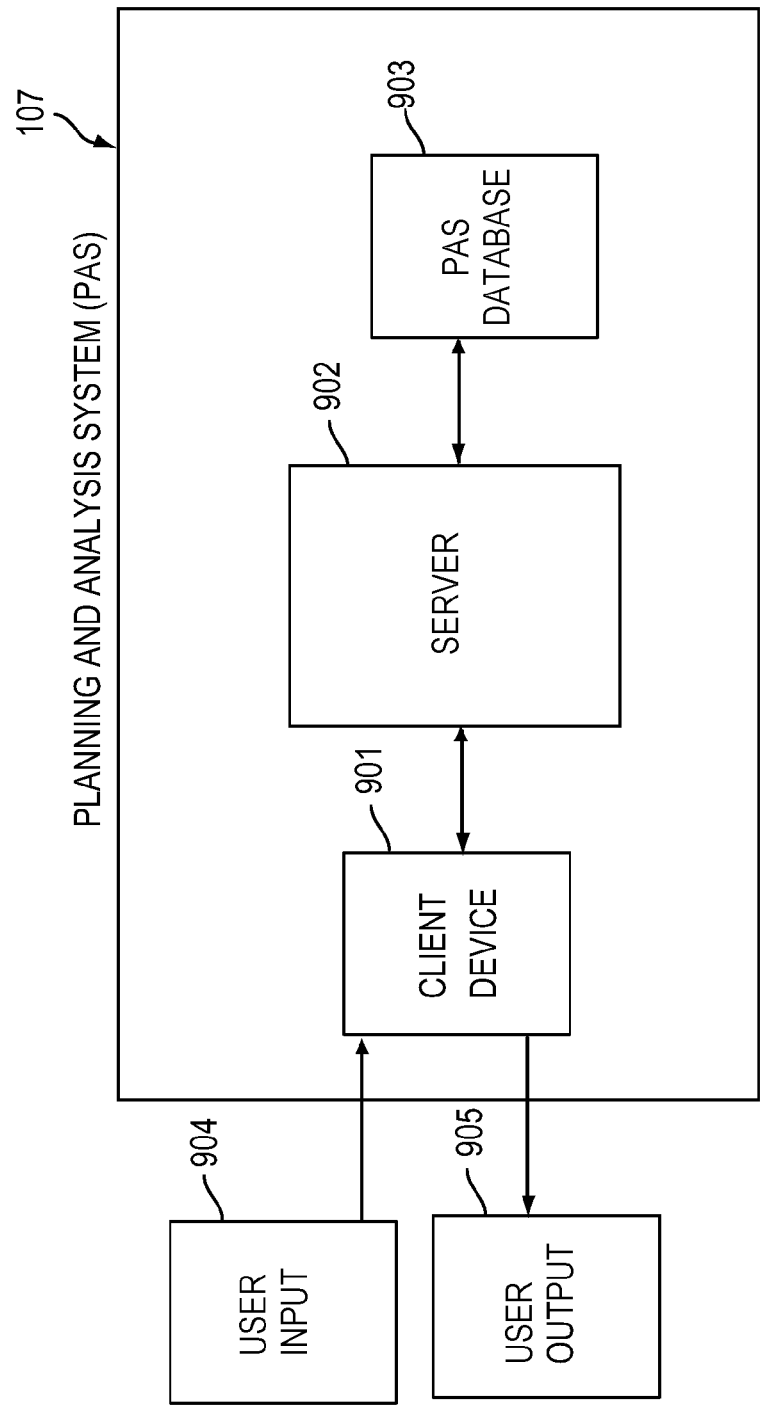
FIG. 9 illustrates a schematic diagram for an exemplary planning and analysis system to receive information for constructing a training mission in accordance with embodiments of the present invention.

Referring now to FIG. 9, a schematic diagram for an exemplary PAS 107 is presented. The PAS 107 can comprise a client device 1301, a server 1302, and a database 1303. The database 1303 can store one or more of planning data, assessing data, PAI data, and data from the artificial intelligence system in accordance with principles of this invention as discussed above. The client device 1301 can be in communication with the server 1302, which can be in communication with the database 1303. As such, the client device 1301 can receive user input 904 to modify data stored in the database 1303. Moreover, the client device 1301 can present user output data 905. The user output data can include data stored in the database 1303, and can include an analytics report as discussed above.

Referring back to FIG. 1, the CDB 108 is geospatial database builder and visualization tool. As such, the CDB 108 can receive geospatial data for constructing a geographical location for a training mission. Accordingly, the CDB 108 can receive geospatial data from one or more external sources, such as the artificial intelligence system discussed above. To do so, CDB 108 can receive a license from an external supplier, such as the Environment Systems Research Institute, to receive the geospatial data.

Accordingly, the geospatial data received by CDB 108 can include the location of features and boundaries of a geographical region of interest at a location through the world, such as natural or constructed features. The geospatial data can be stored as coordinates and topology. As such, the geospatial data can include satellite imagery, digital elevation models, digital orthophotos, and graphic files. Satellite imagery can comprise images of a geographical region of interest. Digital elevation models can comprise an array of uniformly spaced elevation data. Digital orthophotos can comprise digitalized data from an aerial photograph or other remotely sensed data, in which the displacement or distortion have been removed. Graphic files can be scanned maps, photographs, and images in a designated format (i.e., TIFF, GIF, or JPEG).

Upon receipt of geospatial data, the CDB 108 can translate one or more external sources having different formats, as well as optionally multiple layers levels/layers of detailed structure, for a geographical region into a single, common format for use within one or more simulators. By receiving different formations from multiple sources, the CDB 108 can visualize a wide variety of formats in its original source and mix it with existing data already stored in the CDB 108. As such, the CDB 108 can serve as a repository for geospatial data. This can allow the CDB 108 to include the best resolution available in the detailed structure for the geographical region, permit access only to the level of detail needed for each scenario, and provide a stimulation with the appropriate resolution for each training component based on its real-world capabilities (i.e., an aircraft simulation may have a lower terrain fidelity that that of a first person perspective) Moreover, by having multiple levels of detail, the CDB 108 can provide real-time updates of one or more events occurring in a training mission during transmission of the training mission. By having a single, common format, the CDB 108 can return geospatial data to the PAS 107.

As such, the CDB 108 can receive geospatial data from the surveillance device 114. The surveillance device 114 can comprise drone and/or airplane captured videos. As such, the surveillance device 114 can capture geospatial data of a geographical region of one or more one or more participating entities in the training mission. Upon capturing the geospatial data, the surveillance device 114 can send the geospatial data to the training server 101, which then sends it to the CDB 108. At this time, the CDB 108 can translate the geospatial data captured from the surveillance device 114 into the single, common format being utilized. In doing so, the CDB 108 can correlate and mix the geospatial data from the surveillance device 114 with existing geospatial data for a particular geographical area. Thereafter, the CDB 108 can send the mixed geospatial data to the training server 101, which can then transfer the mixed geospatial data to the computing device 104. By doing so, the participating entities and/or planners can verify the mixed geospatial data for the geographical area. Upon verification, the training server 101 can send transfer the mixed geospatial data to the content management module 110, and/or can send a notification to the CDB 108 and/or PAS 107 to update the geospatial data for the geographical area.

Figure 10:
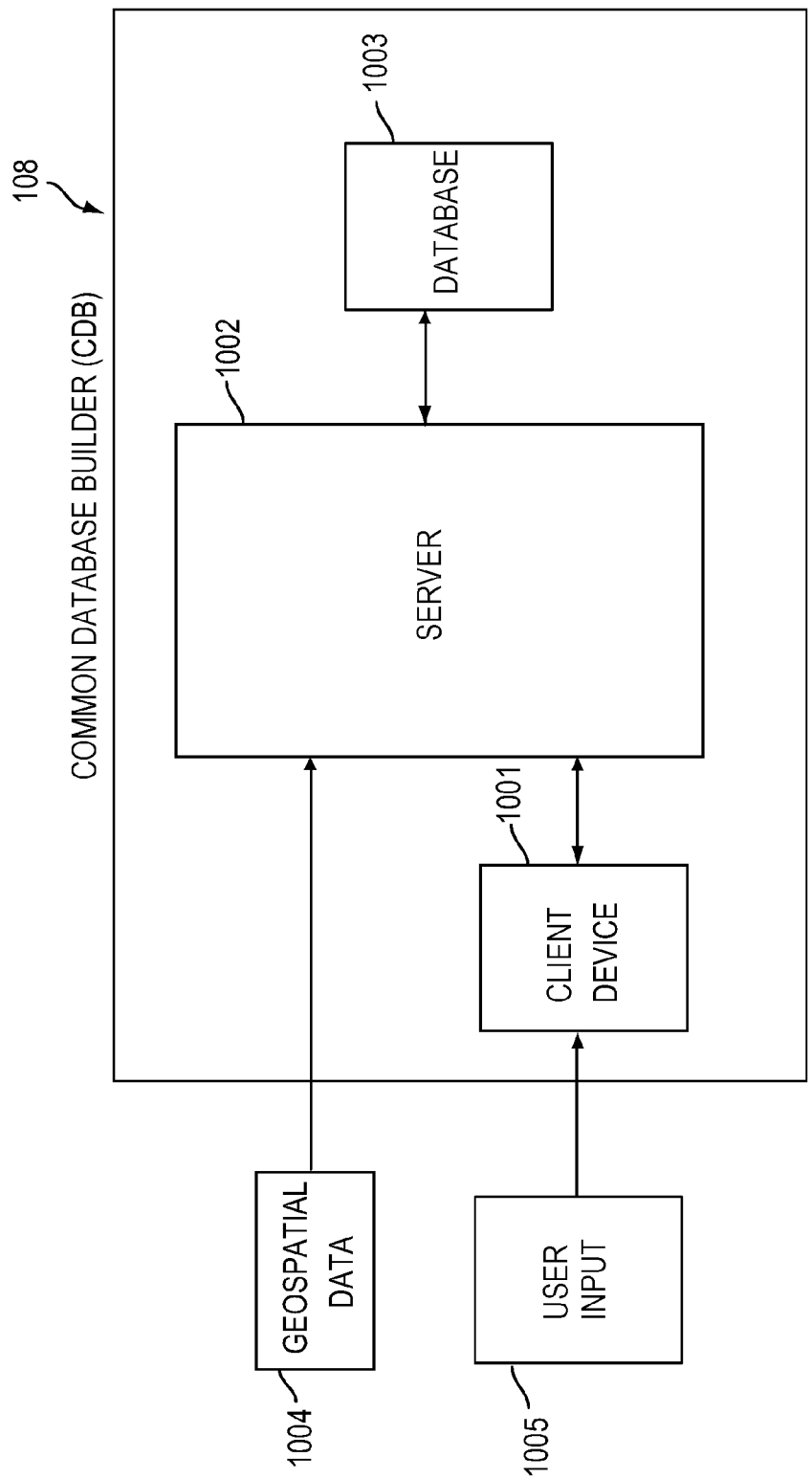
FIG. 10 illustrates a schematic diagram for an exemplary common database builder to receive information for constructing a training mission in accordance with embodiments of the present invention.

Referring now to FIG. 10, a schematic diagram for an exemplary CDB 108 is presented. The CDB 108 can comprise a client device 1001, a server 1002, and a database 1003. The server 1002 can receive geospatial data 1004 from one or more external sources, including the surveillance device 114 (illustrated in FIG. 1) in accordance with principles of this invention as discussed above. The database 1003 can store geospatial data 1004 received from the server 1002. The client device 1001 can receive user input 1005 to manipulate and/or edit the geospatial data stored in the server 1002. The client device 1001 can also present user output data 1006. The user output data 1006 can be geospatial data stored in the database 1003.

Referring now to FIG. 1, the DMR 109 can receive PAI from the source. The DMR can be in communication with the PAS 107 and/or CDB 108. As such, the DMR 109 can transmit PAI to the PAS 107, and can receive geospatial data from the CDB 108 that corresponds to the PAI. According to an embodiment, the DMR 109 can receive PAI of a target individual from the source, and can receive geospatial data from the CDB 108 for a geographical location relating to the PAI.

Figure 11:
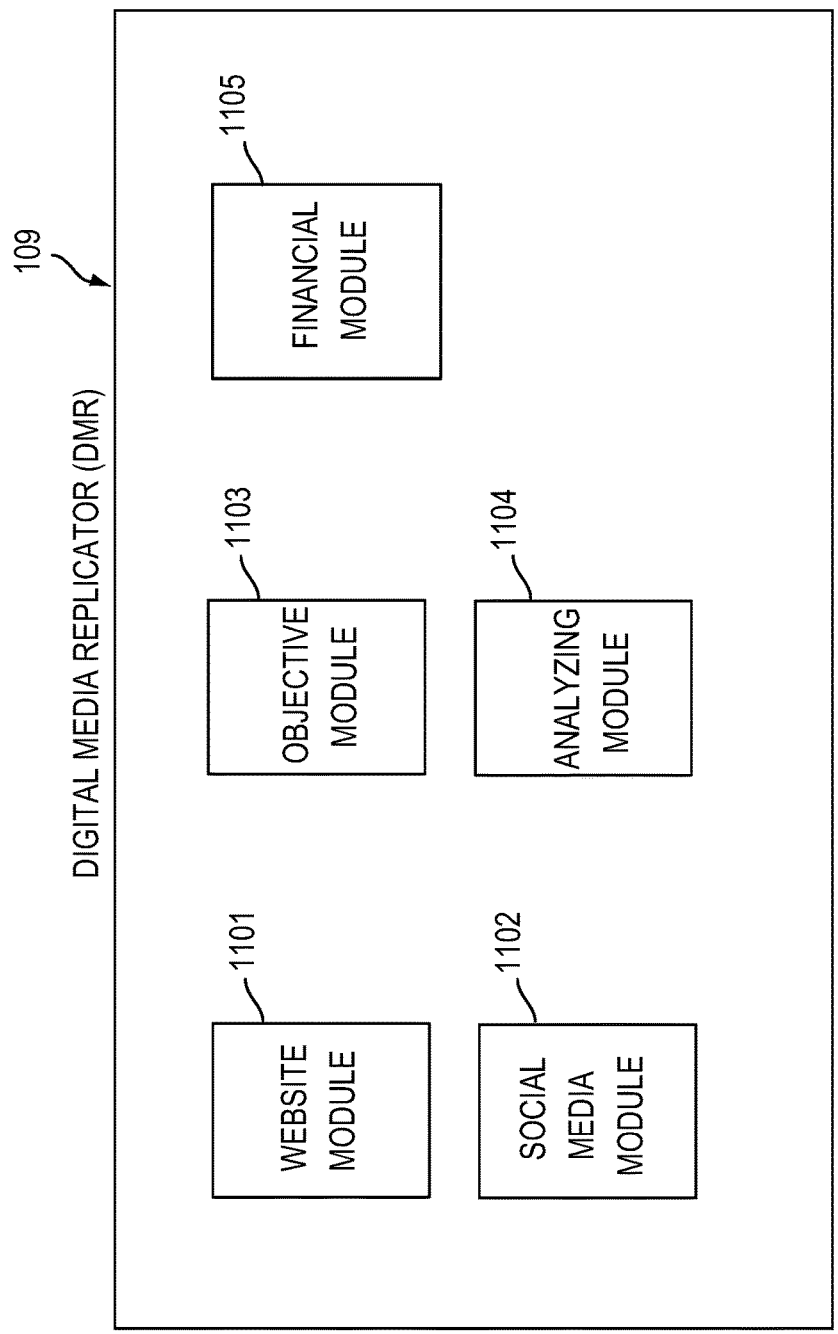
FIG. 11 illustrates modules for an exemplary digital media replicator to receive information for constructing a training mission in accordance with embodiments of the present invention.

Referring now to FIG. 11, an exemplary DMR 109 is depicted. The DMR 109 can add realistic human factors to the training scenario. To do so, the DMR 109 can comprise one or more of a website module 1101, a social media module 1102, an objective module 1103, an analyzing module 1104, and a financial module 1105.

The website module 1101 can receive can receive data from one or more websites. As such, the websites module 801 can receive PAI relating to an event or a series of events in one or more geographical regions. This can be in the form of local, worldwide, and/or tabloid news, can be real or fictitious PAI. Accordingly, the website module 1101 can receive information from websites including, but not limited to, New York Times, Yahoo! News, Google News, CNN, Fox News, NBC News, Washington Post and USA Today.

In addition, the website module 1101 can permit a user (i.e., a subject matter expert, a designer, or a planner) to design and/or author a "mock" website for a training mission in a particular geographical location. The mock website can comprise any real and fictitious information relate to the training mission. As such, the mock website can be of real or fictional target individuals. To create the mock website, the website module 1101 can comprise a standard wiki-interface.

The social media module 1102 can receive PAI data from one or more social media platforms. The social media platforms may include any website or application that allows its users to create and share content. Exemplary social media platforms may include Facebook®, Twitter®, YouTube®, and Tencent QQ®. The social media module 1102 can determine PAI data that is needed and pull such data from one or more PAI sources. As such, to determine a scenario for a mission, the social media module 1102 can determine the PAI data needed and simulate complexities of human domain on multiple levels. For example, according to an embodiment, the social media module 1102 can determine the motivations of Ukrainian based on PAI from the social media platform.

The objective module 1103 can receive PAI relating to an objective of a training missions from one or more external sources. The external source of the objective module 1103 can be the same or different than those of the website module 1101 and the social media module 1102. According to an embodiment, the objective can relate to a target individual and include any information related thereto such as, but not limited to, a picture of the hostile individual, one or more biometrics of the hostile individual (i.e. a finger print), a criminal history of the hostile individual, etc. According to another embodiment, the objective may relate to a geographical area (i.e., state, city, country) and include any information related to the geographical area such as, but not limited to, a map of geographical region, a population of the geographical religion, one or more of religions of the geographical region, a list of hostile individuals in the geographical region, etc.

The analyzing module 1104 can track one or more data points relating to PAI in the website module, the social media module, and/or objective module. As such, the analyzing module 1104 can provide for relevant information from the PAI in of the website module, the social media module, and/or objective module.

The financial module 1105 can comprise any financial PAI provided by an entity relating to a training missions in a geographical regions. The entity can be any party funding a training mission including, but are not limited to, an owner of a company, a government nation, a third party. This will allow users to simulate real-world missions having limited finances (i.e., monies).

As such, the DMR 109 can receive geospatial data from the PAS 107 for a geographical region, and can assign PAI from the modules of the DMR 109. In doing so, the DMR 109 can add real and/or fictitious information to the geospatial data. The DMR 109 can also permit a user (i.e., a subject matter expert, a designer, or a planner) to view and/or modify the received real and/or fictional information, as well as any oilier data received by the modules of the DMR discussed above. Along these lines, the training server 101 can provide the computing device 104 for planners to view and/or modify the data received by the modules of the DMR 109, and for role players to view the data received by the modules of the DMR 109. This can be done prior to or during the training exercise.

Figure 12:
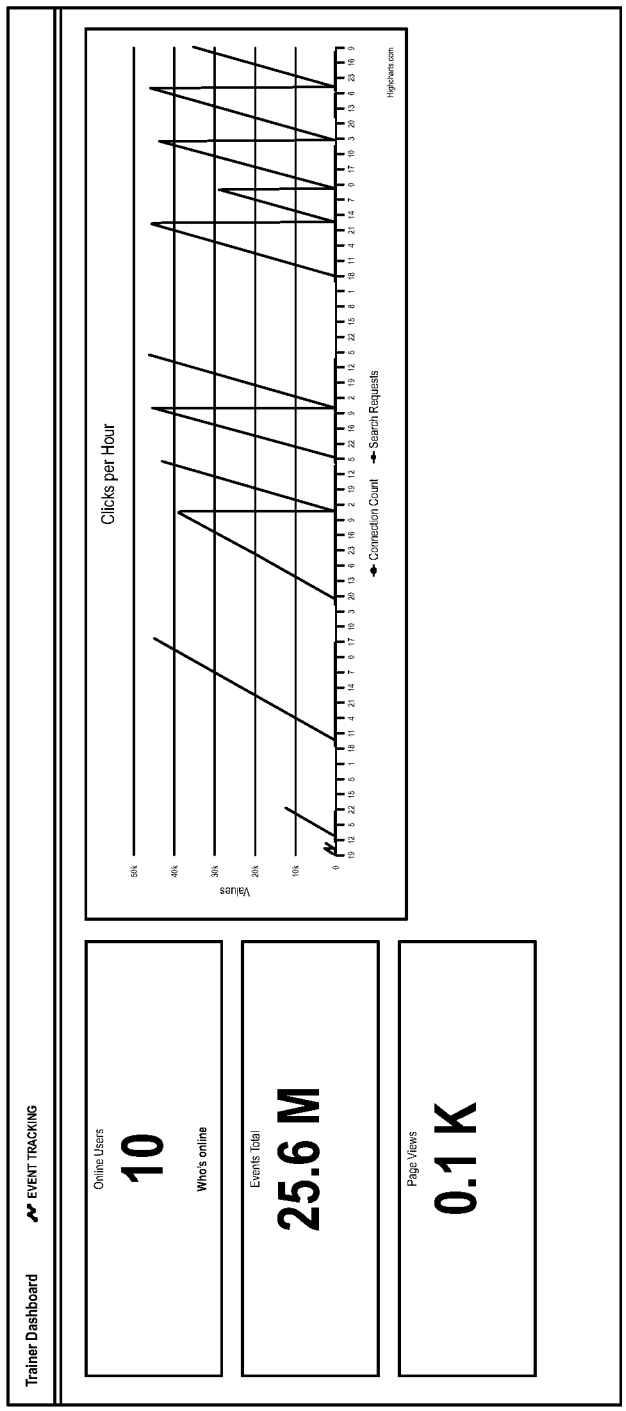
FIG. 12 illustrates an exemplary user interface provided by a digital media replication in accordance with embodiments of the present invention.

Referring now to FIG. 12, an exemplary user interface of provided by DMR 109 is illustrated. As shown, the DMR 109 can provide a subject matter expert, designer, planner, and/or role player with one or more of: a number of users online who are currently streaming the related information ("Online Users"), a number of total events pertinent to the related information ("Events Total"), and a number of page visits to online material pertinent to the related information ("Page Views"). Each of these items may be selected by the user to provide a list of detailed information of each item. For example, a subject matter expert, a designer, a planner, and/or a role player can select "Online Users" to view a detailed list of all users online. Moreover, the DMR 109 can provide a graph illustrating clicks per hour for information pertinent to the related information. This can allow the subject matter expert, designer, planner, and/or role player to ensure that the DMR 109 is receiving the appropriate data.

Figure 13:
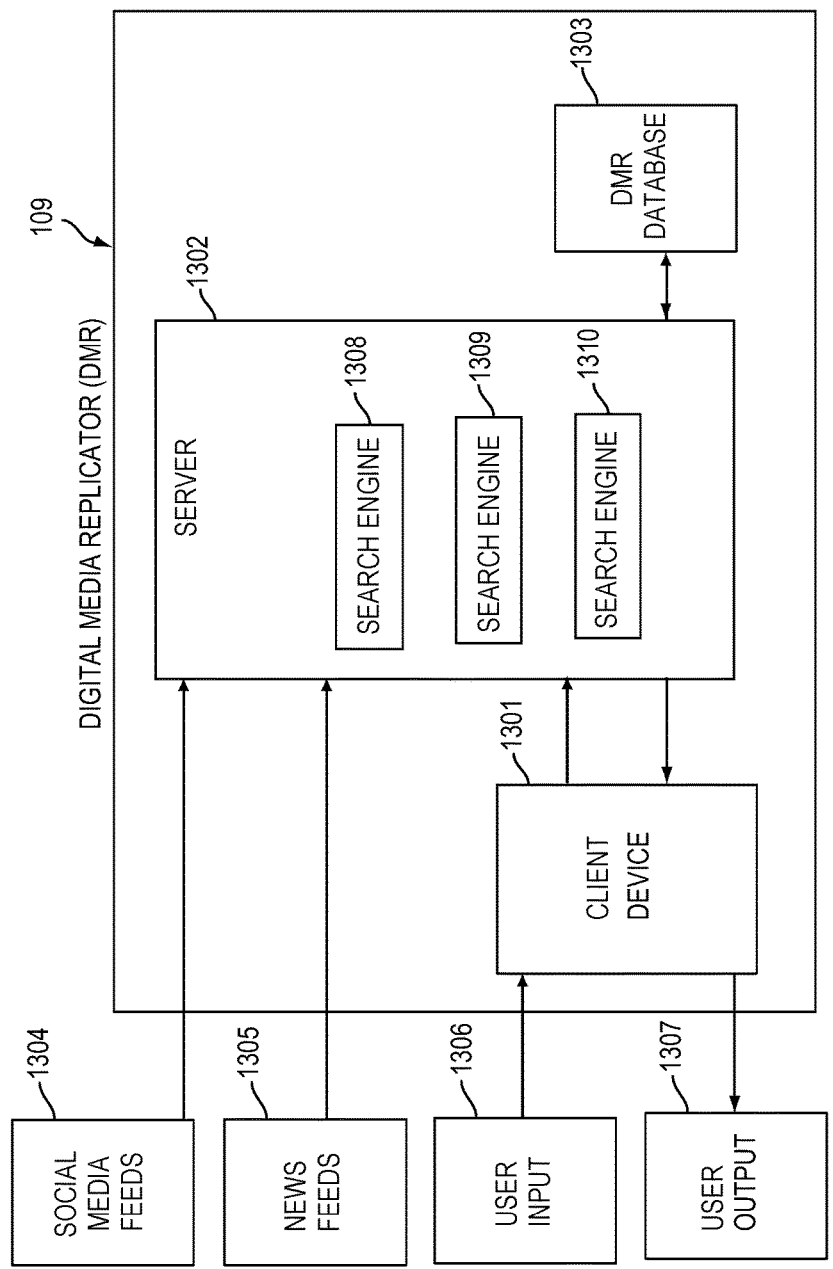
FIG. 13 illustrates a schematic diagram for an exemplary digital media replicator to receive information for constructing a training mission in accordance with embodiments of the present invention.

Referring now to FIG. 13, a schematic diagram for the DMR 109 is presented. The DMR 109 can comprise one or more of a client device 1301, a server 1302, and a database

1303. The server 1302 can receive social media feeds 1304 and/or news feeds 1305, and can store such feeds into the database 1303. The client device 1301 can receive user input 906 and be in communication with the server 1302. To do so, the server 1302 can comprise one or more search engines 1308-1310. The search engines 1308-1310 can permit a user to search for PAI stored in the database 1303.

As such, a user (i.e., a subject matter expert, a designer, or a planner) can load, modify, and/or update PAI stored in database 1303 through the client device 1301 in accordance with principles of the invention as discussed above. This can be done during transmission of a training mission, after transmission of a training mission, and/or while designing a training mission. By having such functionality, the DMR 109 can be dynamically interactive as the training is being conducting, thus allow users and/or role players the ability to realistically adjust the media environment to challenge the role players and meet goals of the training mission. Furthermore, the client device 1301 can present user output data 907. The user output data 907 can be PAI stored in the database 1303.

Moreover, the client device 1301 can provide a data viewer window and/or a geovisualization window. The data viewer window can present one or more of text, chart and imagery for a training mission. To do so, the DMR 109 can receive data from the PAS 107 (illustrated in FIG. 1). As stated above, the data from the PAS 107 can include non-georeferenced data, such as from the artificial intelligence system, and compiled data from the CDB 108. The geovisualization window can provide a user with geospatial data from the CDB 108 (illustrated in FIG. 1), can permit a user to select data in the window based on common geospatial selection methods and export selection in the CDB 108.

Referring back to FIG. 1, the computing device 104 can be in communication with the training server 101, which in turn is in communication with the scenario server 102. Alternatively, although not illustrated, the computing device 104 can be in direct communication with the scenario server 102. In either case, the training server 101 can be in communication with the backend system 103 to create and/or edit the training mission.

To create, edit, and/or update a training mission, the scenario server 102 can comprise one or more of a content management module 110, an intelligence module 111, and a logistics module 112. Each of these modules can be in communication with one or both of the training server 101 and the backend system 103.

The content management module 110 can receive the planning data from the PAS 107 and the PAI from the DMR 109 to create a training mission for participating entities. In doing so, the content management module 110 can correlate data received from the DMR 109 to geospatial data received from the PAS 107 of geographical regions of participating entities. As noted above, the participating entities may be located in different geographical locations. As such, the content management module 110 can create different instances for each participating entity by correlating the PAI received from the DMR 109 with the appropriate geospatial information. By doing such, the content management module 110 is able blend real and fictionalized (synthetic) content to simulate a training mission.

Moreover, the content management module 110 can simulate a geographical region different than that of one or more participating entities. To do so, the content management can also receive geospatial data of the simulated geographical region. The content management module the geospatial data of geographical region of which it attempts to stimulate with the geospatial information of each instance (created for each participating entity in different geographical regions).

Along these lines, the content management module 110 can also receive assessing data from the PAS 107 to determine the performance of a role player or a team of the role player. The assessing data can be the same or different for each role player or team of the role player based on the participating entity's geographical location.

The content management module 110 can also provide one or more application program interfaces (APIs) to permit a user (i.e., a subject matter expert, a designer, or a planner) to edit a training mission. The APIs can be the same or different based on the type of data inputted by the user. The types of data can be one or more of intelligence data, operations data, and performance data.

Along these lines, the content management module 110 can permit a user (i.e., a subject matter expert, a designer, or a planner) to dynamically update the training mission while a role player or a team of the role player are completing the training mission. To do so, the content management module 110 can comprise one or more scraping algorithms to receive, store, and update a training missions from data received from said participating entities, planners, and/or audience member during transmission of the training mission.

The intelligence module 111 can permit one or more variables of the data model of the training mission to be injected into the training exercise in real-time. Along these lines, the intelligence module 111 can also permit manipulation of the variables of the data model in real-time. The variables can include real or synthetic information including, but not limited to, economic conditions, weather ethnic violence, and civil unrest. The realistic variable(s) can include one or more of actual intelligence gathered from the field, real or fictitious social media, and other data inputted by the planner or subject matter expert. An example would be personnel recovery in a hostile area in a mountainous arid region in Northern Togo. The intelligence module 111 can emulate such variables including, but not limited to, geospatial intelligence layers (physical, Infrastructure, demographics and forensics), dynamic tracking links of assets and threats and intercepted communications. Intercepted communications include social media feeds which may include foreign languages translated on the fly.

The intelligence module 111 can further extract information learned from the training exercise. As such, the intelligence module 111 can be in communication with the content management module 110 to utilize such information for creation of future training exercises. By extracting such information, the intelligence module 111 can address one or more gaps in a training mission including. Exemplary gaps may relate a scenario of a training mission, an objective of a training mission, a metric for determining performance of role player or a team of the role player, etc. Exemplary information that can be extracted include, but are not limited to, forensics, biometrics collection, and analysis of terrorist threats, as well as improved tagging, tracking and location functions.

As such, the intelligence module 111 can modify and/or update one or more variable of the data model from data gathered form the training mission. As such, the intelligence module can update data received from the various components of the central database 106, such as the PAI of a target individual received from the DMR 109. Moreover, intelligence module 111 can be in communication with backend system 103, such as the exercise database 701, the historical database 704, the support database 705, and the RMT database 706 (each illustrated in FIG. 7) of the central database 106 as well as the CDB 108 and DMR 109.

Accordingly, by updating the variables of the training mission, the intelligence module 111 can permit the content management module 110 to utilize such information for creation of future training exercises. The intelligence module 111 can also permit allows special operation forces and/or subject matter experts to dynamically input or manipulate data gathered from the field, social media and/or intercepted from other communications sources. According to an embodiment, the intelligence module 111 can allow data to be extracted out of a geographic region to be reused and overlay time sequenced scenarios of past events or operations. This can assist in preparing for future irregular conflict and other crisis events, and can allow the system to automatically get 'smarter' about the geographic and cultural aspects the environment during and after each use.

The logistics module 112 can determine the feasibility of a training mission based on one or more logistic variables. The logistic variables include a performance of a role player or a team of the role player, a potential cost of the training mission, an available budget of the training mission, a number of available role players for the training mission (i.e., ground units, air assets), civilian population, hostile targets, etc. The logistic variables can be entered and/or updated by a user (i.e., a subject matter expert, a designer, a planner) and/or during the transmission of a training exercise. As such, the logistics module 112 can determine potential costs and risks of the training mission in the simulated geographical region. Along these lines, the logistics module 112 can determine if the training mission would be successful in the simulated geographical region, or in other geographical regions not simulated.

Figures 14, 15:
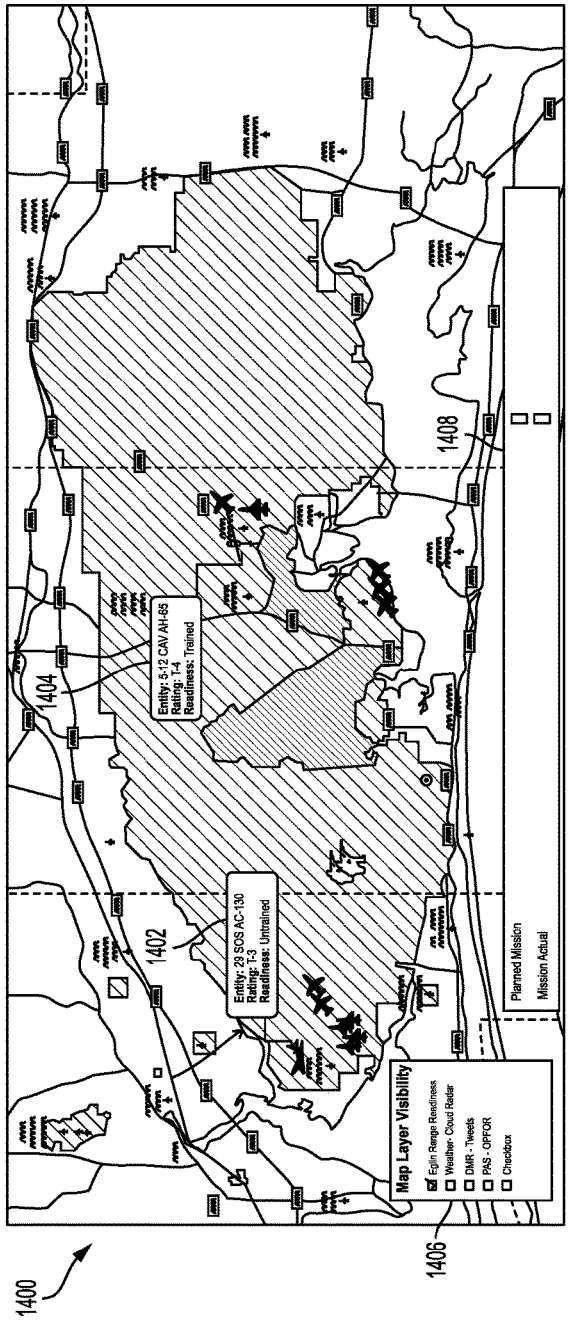
FIG. 14 illustrates an exemplary view of a training mission on a computing device in accordance with embodiments of the present invention.
FIG. 15 illustrates exemplary ratings of role players in a training mission in accordance with embodiments of the present invention.

Referring now to FIG. 14, an exemplary view 1400 of a plurality of participating entities in a training mission on a computing device is illustrated. The view 1400 is presented on a map of a geographical region that the training mission is taking place. The view 1400 can also provide a map layer visibility chart 1406 for a user. The map layer visibility chart 1406 can include one or more layers that can be overlaid onto the map of geographical region of interest. As illustrated, the layers can include "Eglin Range Readiness," "Weather—Cloud Radar," "DMR—Tweets," "PAS OPRFOR," and "Checkbox." "Eglin Range Readiness" can illustrate areas within the geographical region that an Air Force Material Command base serving as the focal point for Air Force armaments are able to strike. "Weather—Cloud Radar" can illustrate cloud coverage within the geographical region. "DMR—Tweets" can illustrate the location of tweets received by the DMR pertinent to the training mission within the geographical region. "PAS OPRFOR" can illustrate the location of opposing forces within the geographical region. "Checkbox" can illustrate the location of completed objectives and/or tasks within the geographical region.

Furthermore, the view 1400 can provide with a time sequence 1408 of the planning mission compared to the actual mission. This can allow the planners, audience members and role players to visualize the progress of the training exercise taking place compared to planned, ideal mission. As illustrated, this can be presented on the computing device while the tracking the participating entities.

Moreover, as discussed above, the computing device can track participating entities, including one or more role players 1402, 1404, in the training mission. The computing device can permit a planner, audience member, and/or role player to select a role player. Upon selecting the role player, the computing device can provide an identity of the role player, a rating of the role player, and a mission readiness of the role player. For example, as illustrated, the role player 1402 can be a 29$^{th}$ Special Operations Squadron operating a Lockheed AC-130 gunship aircraft ("29 SOS AC-130"). The role player 1402 can have a "T-3" rating, and can be considered "Untrained." Moreover, the role player 1404 can be Cavalry operating a Lockheed AC-130 Cheyenne helicopter. The role player can have a "T-3" rating, and can be considered "Trained." The rating and mission readiness can be based on the performance and training of the role player, which will be discussed in more detail below.

Referring back to FIG. 1, to determine a performance of the role player, the training server 101 can comprise an analysis module 113. The analysis module 113 can receive assessing data from the PAS 107 and/or content management module 110, along with data from the computing device 104 and/or biometric device 105. As such, the assessment data can be customized to the role player's geographical location and, thus, can be different each role player. By utilizing customized assessment data, the analysis module 113 can provide objective feedback to role players, planners, and/or audience members.

As such, the analysis module 113 can present the performance by way of a report. The report include of progress and/or health of the participating entity. The report can include a map and/or indicator illustrating one or more strengths and/or weaknesses of the role player in the training mission. To illustrate the strength and weakness, the map and/or indicator can provide a plurality of colors, such as green, yellow, and red. The report can be presented to role players, planners, and/or audience members on computing device 104 or as a hard copy.

Along these lines, the analysis module 113 can present the report to role players, planners, and/or audience members on computing device 104 during and/or after the training mission. As such, during the training mission, the analysis module 113 can provide web forms to planners to captures their observations and feedback. This can allow the planners and/or audience members to provide instantaneous updates to audience members and/or role player, and can allowing a user to adjust the training exercise as needed.

Moreover, the analysis module can comprise a first and a second set of performance metrics. The first set of performance metrics can indicate completions tasks against objectives in the training mission. The second set of performance metrics can be provide a level of confidence of mission realism and execution of the role player. The first and second sets of performance metrics can be different from one another. Moreover, the first and second performance metrics can provide distinct outcomes that are provided to the role players, planners, audience members, designers, and/or subject matter experts.

Figure 16A:
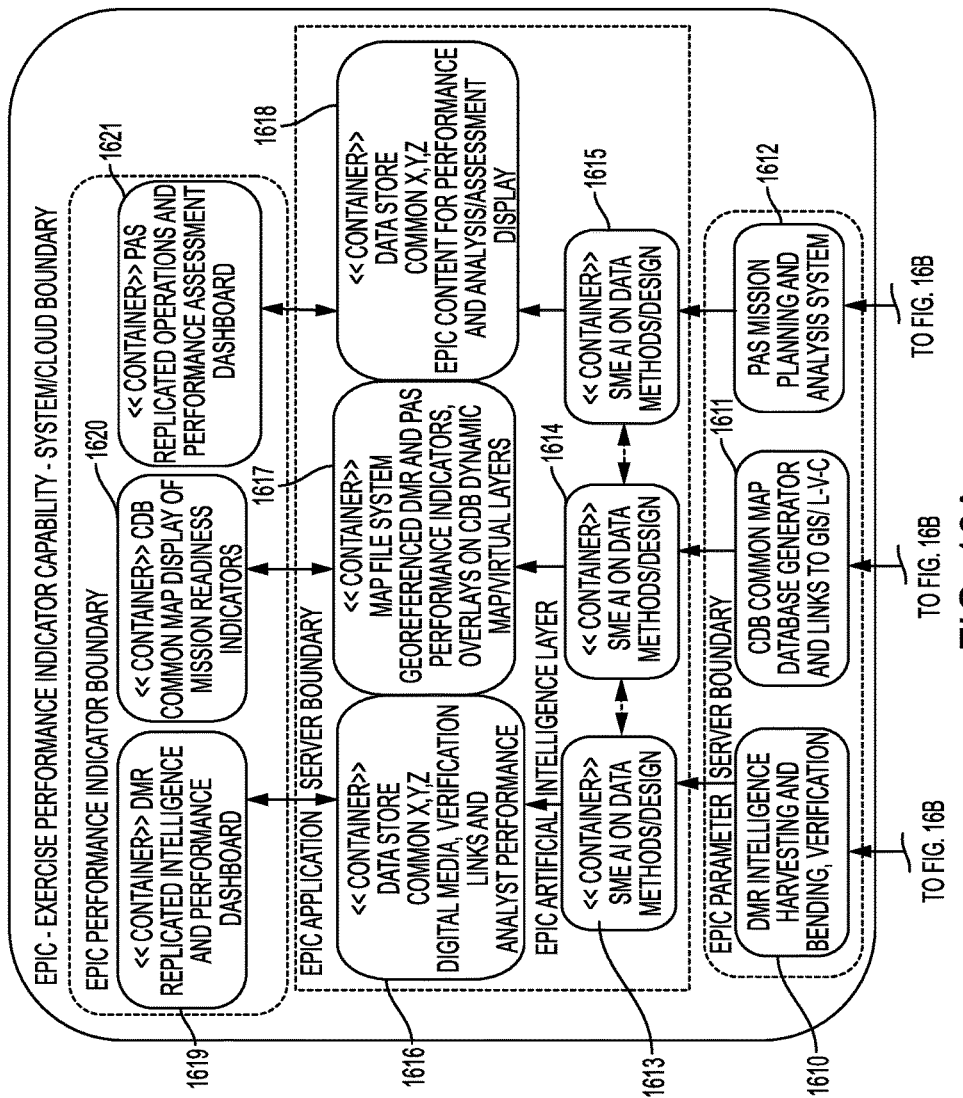
FIGS. 16A and B illustrate an exemplary system for determining mission readiness in accordance with embodiments of the present invention.
Figure 16B:
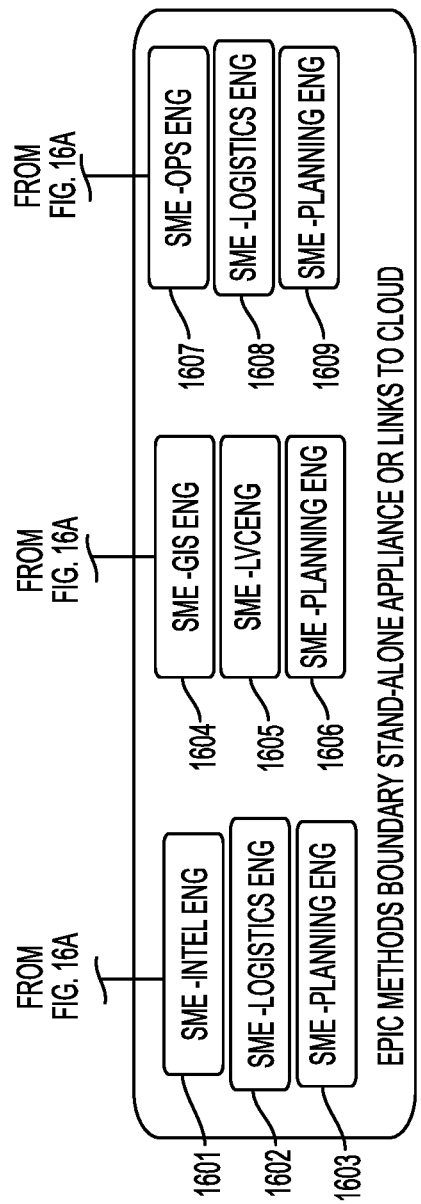

As such, the analysis module 113 can determine a rating and mission readiness the role player. The level of mission readiness of the role player can be presented during and/or after the training mission. The level can be based on a number of days trained, or can be based on previous operational experience. Referring now to FIG. 15, exemplary ratings of role players in a training mission is depicted. The ratings can comprise a plurality of levels, for example "T-1," "T-2" "T-3," and "T-4." The levels can each require a number of days of training. For example, "T-1" can correspond to less than or equal to 14 days, and "T-2" can correspond to from 14 days to 28 days. Moreover, the levels can each correspond to the percentage of operationally ready aircrews for assigned personnel and the percentage of mission-essential tasks trained for assigned personnel. For example, "T-1" can correspond to less than equal to 85% of operationally ready aircrews for assigned personnel and 85% of mission-essential tasks trained for assigned personnel, and "T-2" can correspond to less than equal to 70% of operationally ready aircrews for assigned personnel and 70% of mission-essential tasks trained for assigned personnel Referring now to FIGS. 16A and 17B, an exemplary system for determining mission readiness in accordance with embodiments of the invention as described above is depicted. The system can comprise one or more subject matter expert (SME) engines 1601-1609 can be in communication with one or more of a DMR component 1610, a CDB component 1611, and a PAS component 1612. According to an embodiment, a subject matter expert intelligent engine 1601, a subject matter expert logistics engine 1602, and a subject matter expert planning engine 1603 can each be in communication with the DMR component 1610. According to another embodiment, a subject matter expect geographic information system (opps) engine 1604, a subject matter expert live virtual construction (INC) engine 1605, and a subject matter expert planning engine 1606 can each be in communication with the CDB component 1611. According to yet another embodiment, a subject matter expert operational (opps) engine 1607, a subject matter expert logistics engine 1608, and a subject matter expert planning engine 1009 can each be in communication with the PAS component 1612. Each of these subject matter expert modules can select and/or create the information used in the training mission.

Moreover, as stated previously, the DMR component 1610 provides intelligence harvesting, blending and verification of geospatial data received from an open source. The CDB component 1611 provides links to live virtual constructive simulation space and graphic information systems. The DMR component 1610, CDB component 1611, and PAS component 1012 can be in communication with a plurality of artificial intelligence (AI) data storage containers 1617-1617. The AI data storage containers 1613-1615 can be in communication with each other, and can each allow SMEs to design a training mission.

Moreover, the AI data storage containers 1613-1615 can be in communication with a plurality of application data storage containers 1616-1618. According to an embodiment, the DMR component 1610 can be in communication with a first AI data storage containers 1613 which is communication with a first application data storage container 1616. The first application data storage container 1616 can present one or more of digital media, verification links, and analyst performance. According to another embodiment, the CDB component 1611 can be in communication with a second AI storage container 1614 which is in communication with a second application data storage container 1617. The second application data storage container 1617 can correlate georeferenced DMR and PAS performance indicators and overlay on DV map/virtual layers. According to yet another embodiment, the PAS component 1612 can be in communication with a third AI storage container 1615 which is in communication with a third application data storage container 1618. The third application data storage container 1618 can comprise content for performance of a participating entities and display analysis assessment of the participating entity.

Along these lines, the application data storage containers 1616-1618 can be in communication with a plurality of performance data storage containers 1619-1621. According to an embodiment, the first application data storage container 1616 can be in communication with a first performance data storage container 1619. The first performance data storage container 1619 can comprise DMR replicated intelligence and performance dashboard data. According to another embodiment, the second application data storage container 1617 can be in communication with a second performance data storage container 1620. The second performance data storage container can comprise common map display of mission readiness indicators data. According to yet another embodiment, the third application data storage container 1618 can be in communication with a third performance data storage container 1621. Third performance data storage container 1621 can comprise replicated operations and performance assessment dashboard data.

Figure 17A:
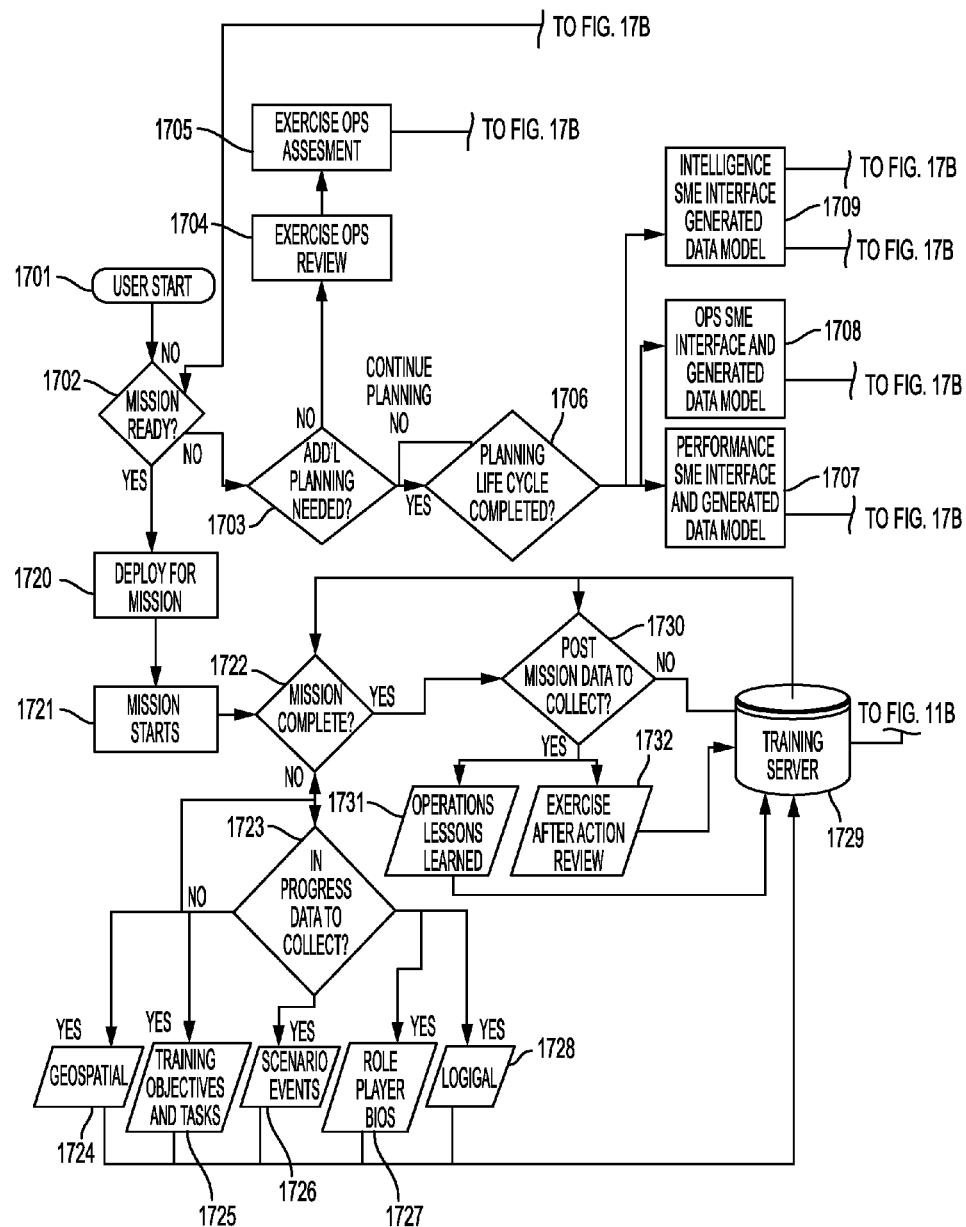
FIGS. 17A and B illustrate an exemplary flowchart for a system to determine mission readiness in accordance with embodiments of the present invention.
Figure 17B:
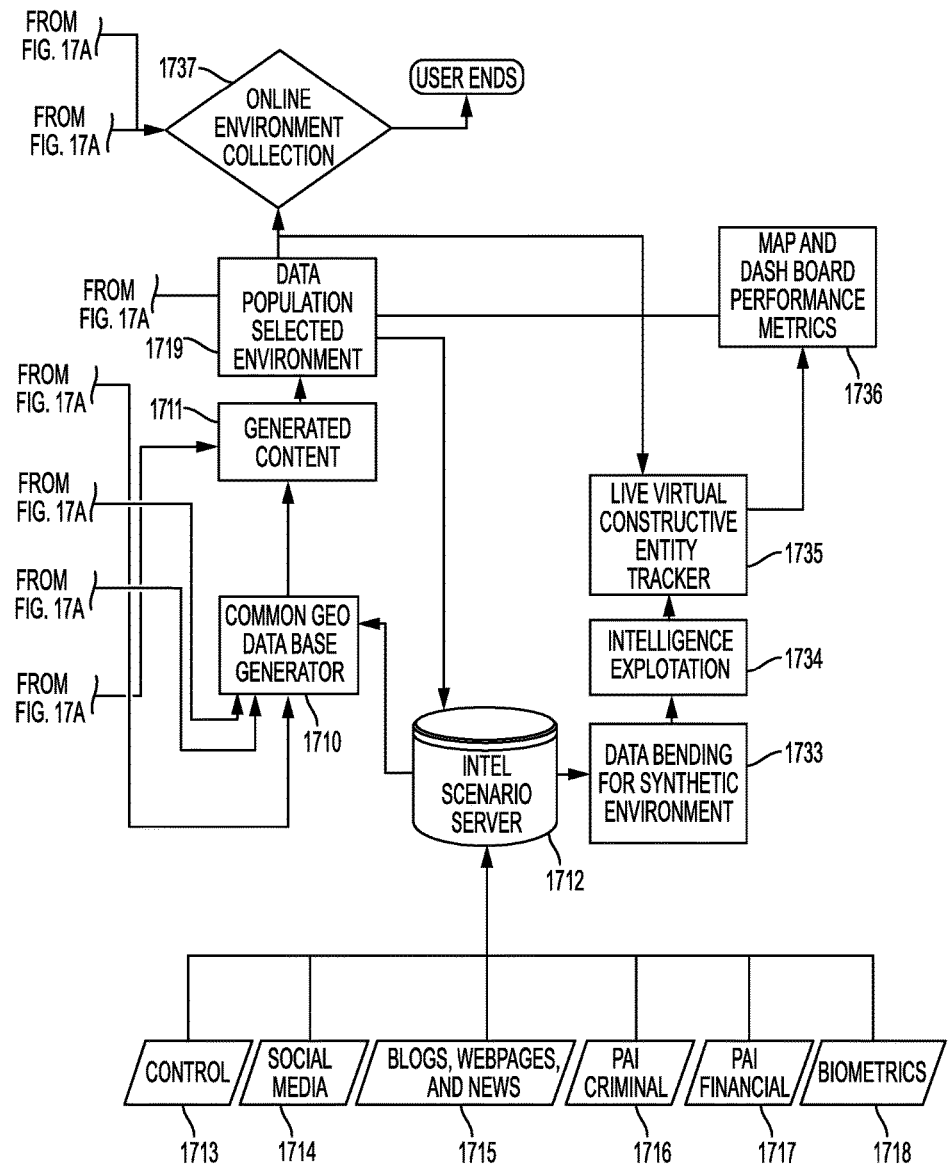

Referring now to FIGS. 17A and B, an exemplary process for providing a mission readiness in accordance with embodiments of the present invention is provided. At step 1701, a user (i.e., a subject matter expert, a planner, or an audience member) starts a training mission. Thereafter, at step 1702, it is determined if the selected training mission is ready to be deployed. This can determined by the training assessment server, 1729, and/or the scenario server 1712. If the selected mission is not ready to be deployed, it is then determined, at step 1703, if additional planning is needed for the training mission. If additional planning is not needed at step 1703, a user to review exercise operations, at step 1704, and thereafter, at step 1705, assesses exercise operations. Subsequently, the process returns to step 1702 to determine if issues relating to the training mission have been resolved.

However, if additional planning is needed at step 1703, it is determined, at step 1706, if a planning life cycle is complete for the training exercise. If the planning life cycle is not complete, the scenario server can provide a number of iterations until the planning life cycle is complete. When the planning life cycle is complete at step 1706, the proceeds to one or more of steps 1707-1709. At step 1707, a subject matter expert enters intelligence data relating to the training mission and a data model is generated and/or updated. At step 1708, a subject matter expert enters operational data relating to the training mission and a data model is generated and/or updated. At step 1709, a subject matter expert enters operational data relating to the training mission and a data model is generated and/or updated. As such, subject matter experts with real-life experience and skills of the training environment are able to more accurately simulate a realistic environment that role players may encounter in a real-world mission.

Upon entering data at one or more of steps 1707-1709, a common database builder (CDB), at step 1710, translates the data to a common format. Thereafter, at step 1711, the translated data is combined with data from a scenario server 1712. The data from the scenario server 1712 can include one or more of geospatial data 1713, social media data 1714, blog, webpage or news data 1715, criminal data 1716 financial data 1717, and biometric data 1718. Subsequently, at step 1719, the scenario server selects data for the training exercise. Thereafter, at step 1736, the scenario server presents the performance metrics of a role player or a team of the role player in the training mission.

As such, upon combining the translated data with the data from the scenario server, the process moves to step 1719 to populate data for a selected environment. Thereafter, the scenario server, 1712, blends the data to make a synthetic environment, at step 1733, and adds intelligence exploitation, at step 1734. Further, at step 1735, the process can configure a live virtual constructive entity tracker. Upon doing so, the process proceeds to 1736 where the online environment selection is ready to be deployed. As such, the process then returns to step 1702 to determine if the selected is now ready to be deployed.

Accordingly, if the training mission is ready to be deployed at step 1702, participating entities are deployed in the training mission, at step 1720, and the training mission starts, at step 1721. Upon starting the training mission, the progression of the training mission is monitored, at step 1722. If the training mission is not complete, the training server can proceed to step 1723 and collect one or more of geospatial data 1724, training objectives and tasks data 1725, scenario events data 1726, participating entity bibliography data 1727, and logistical data 1728. The collected data is be stored in the training server 1729.

Moreover, during progression of the training mission, the training server, 1729, can be in communication with the scenario server, 1712, to generate content for the training mission, at step 1711, and populate data for the selected environment, at step 1719. Along these lines, the scenario server can continue to blend data, at step 1733, to make the selected environment feel authentic and exploit intelligence learned in the training mission from one or more participating entities, at step 1734. Further, a live constructive entity tracker to track the participating entities can be provided, at step 1735, and a map and dashboard of performance metrics of the role player or a team of the role player can be provided, at step 1736.

However, if the training mission is complete at step 1722, the process can proceed to step 1730 to determine if there is post training mission data to collect. If there is post training mission data to collect, the process can determine if there are one or more operation lessons to be learned from the training mission, at step 1731, and can review exercises in the training mission for learning, at step 1732. The collected post mission data can be stored in the training server 1729 for future training missions.

Figure 19:
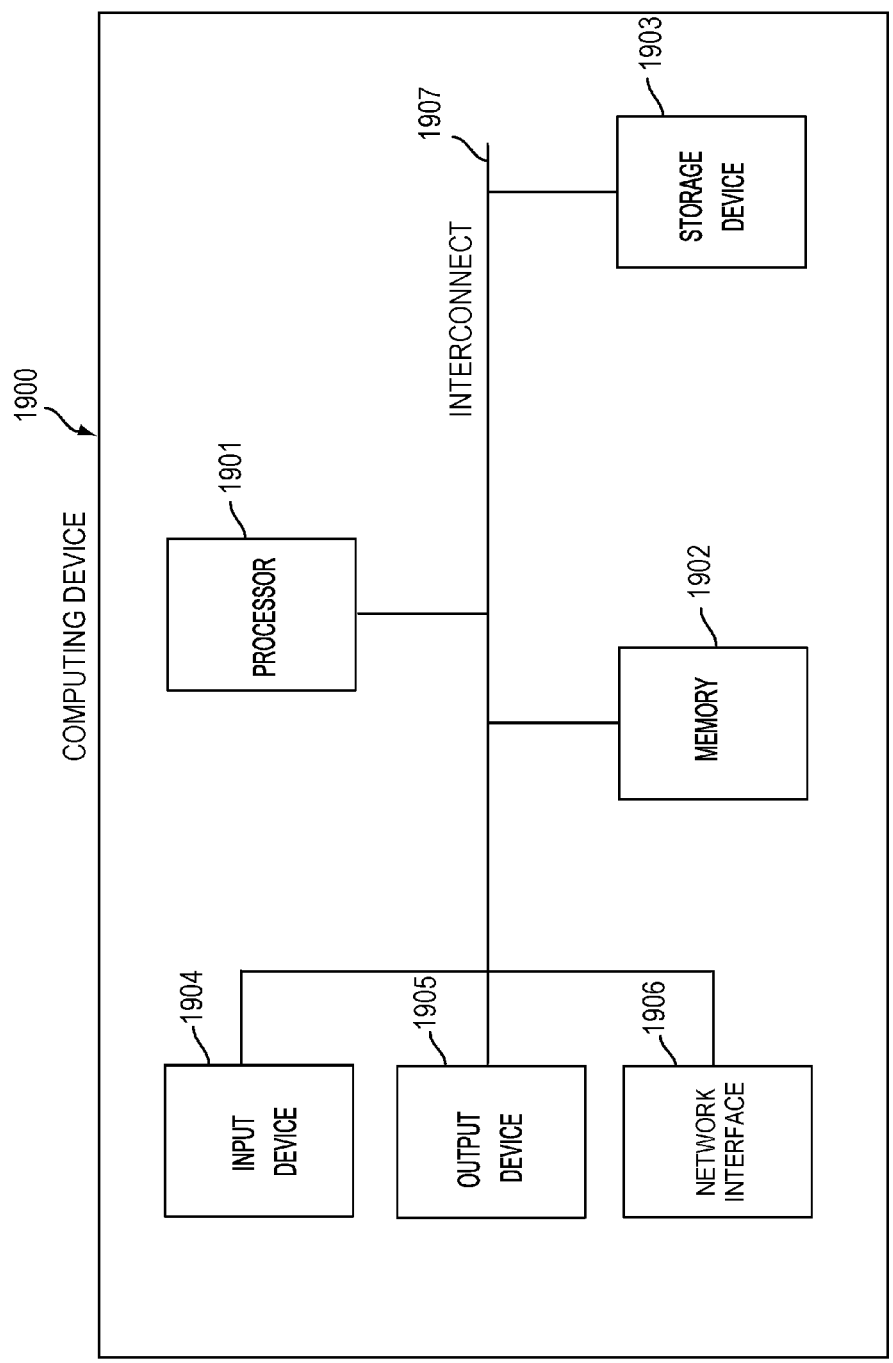
FIG. 19 illustrates an exemplary computing device for receiving a training mission in accordance with embodiments of the present invention.

Referring now to FIG. 19, a diagram of an exemplary system 1800 is shown in accordance with one or more embodiments illustrated above. System 1800 can include one or more computing devices 1801-1803, network 1804, server 1805, database 1807, and software module 1806. As mentioned above, the computing devices 1801-1803 can belong to a role player, planner, or audience member. As such, the role players, planners, and/or audience members can be remotely located at different geographical locations in accordance with principles of the invention. According to an embodiment, a single planner may coordinate a training exercise with a plurality of role players stationed at different geographical locations. According to another embodiment, a plurality of planners stationed at different geographical locations can coordinate a training exercise with a plurality of role players stationed at different geographical locations. According to yet another embodiment, a plurality of planners stationed at different geographical locations can coordinate a training exercise with one or more trainees stationed at a single location.

The computing devices 1801-1803 can be any type of communication device, including a mobile telephone, a laptop, tablet, or desktop computer, a netbook, a video game device, a pager, a smart phone, an ultra-mobile personal computer (UMPC), a personal data assistant (PDA). The computing devices 1801-1803 can run one or more applications, such as Internet browsers, voice calls, video games, videoconferencing, and email, among others. The computing devices 1801-1803 can be coupled to a network 1804 and configured to send and/or receive data through the network 1804.

The planners and/or audience members can communicate with role players over the network 1804 in accordance with principles of the invention. Network 1804 can provide network access, data transport and other services to the devices coupled to it in order to send/receive data from any number of user devices, as explained above. In general, network 1804 can include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, network 1804 can implement one or more of a GSM architecture, a General Packet Radio Service (GPRS) architecture, a Universal Mobile Telecommunications System (UMTS) architecture, and an evolution of UMTS referred to as Long Term Evolution (LTE). Network 1804 can, again as an alternative or in conjunction with one or more of the above, implement a WiMAX architecture defined by the WiMAX forum. Network 1804 can also comprise, for instance, a local area network (LAN), a wide area network (WAN), the Internet, a virtual LAN (VLAN), an enterprise LAN, a virtual private network (VPN), an enterprise IP network, or any combination thereof.

Figure 18:
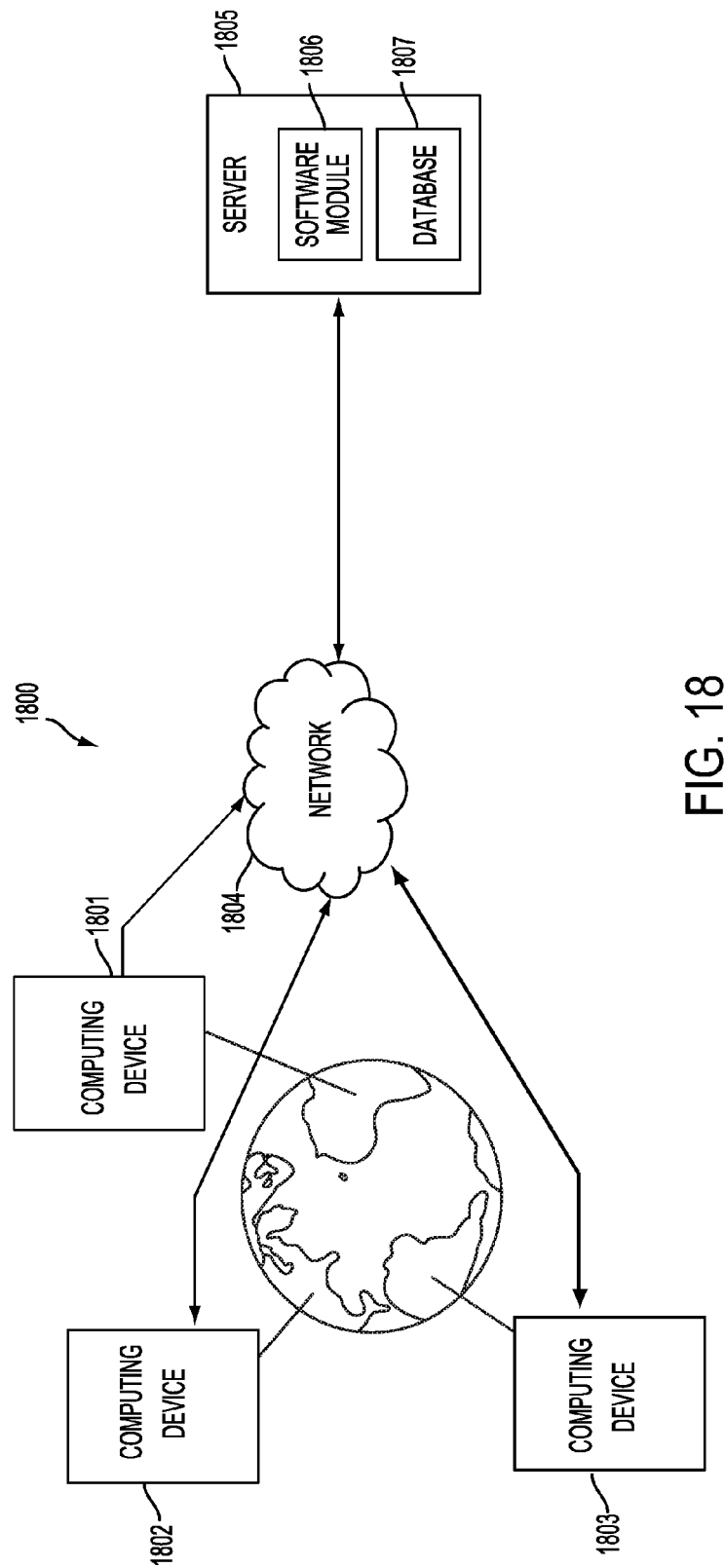
FIG. 18 illustrates an exemplary system for determining mission readiness in accordance with the embodiments of the present invention.

Server 1805 can also be any type of communication device coupled to network 1804, including but not limited to a personal computer, a server computer, a series of server computers, a mini computer, and a mainframe computer, or combinations thereof. Server 1805 can be a web server (or a series of servers) running a network operating system, examples of which can include but are not limited to Microsoft Windows Server, Novell NetWare, or Linux. Server 1805 can be used for and/or provide cloud and/or network computing. Although not shown in FIG. 18, server 1805 can have connections to external systems like email, SMS messaging, text messaging, ad content providers, etc.

Database 1807 can be any type of database, including a database managed by a database management system (DBMS). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Oracle database, IBM DB2, Adaptive Server Enterprise, FileMaker, Microsoft Access, Microsoft SQL Server, MySQL, PostgreSQL, and a NoSQL implementation. A DBMS typically includes a modeling language, data structure, database query language, and transaction mechanism. The modeling language is used to define the schema of each database in the DBMS, according to the database model, which can include a hierarchical model, network model, relational model, object model, or some other applicable known or convenient organization. Data structures can include fields, records, files, objects, and any other applicable known or convenient structures for storing data. A DBMS can also include metadata about the data that is stored.

Software module 1806 can be a module that is configured to send, process, and receive information at server 1805. Software module 1806 can provide another mechanism for sending and receiving data at server 1805 besides handling requests through web server functionalities. Software module 1806 can send and receive information using any technique for sending and receiving information between processes or devices including but not limited to using a scripting language, a remote procedure call, an email, a tweet, an application programming interface, Simple Object Access Protocol (SOAP) methods, Common Object Request Broker Architecture (CORBA), HTTP (Hypertext Transfer Protocol), REST (Representational State Transfer), any interface for software components to communicate with each other, using any other known technique for sending information from a one device to another, or any combination thereof.

Although software module 1806 can be described in relation to server 1805, software module 1806 can reside on any other device. Further, the functionality of software module 1806 can be duplicated on, distributed across, and/or performed by one or more other devices, either in whole or in part.

Referring now to FIG. 19, an exemplary computing device for receiving a training mission in accordance with embodiments of the present invention is presented. The computing device 1900 may include processor 1901, memory 1902, storage device 1903, input device 1904, output device 1905, and network interface 1906. Processor 1901 may include logic configured to execute computer-executable instructions that implement embodiments of the invention. An example of a processor that may be used with the invention includes the Pentium® processor, Core i7® processor, or Xeon® processor all available from Intel Corporation, Santa Clara, Calif.

Memory 1902 may be a computer-readable medium that may be configured to store instructions configured to implement embodiments of the invention. Memory 1902 may be a primary storage accessible to processor 1901 and can include a random-access memory (RAM) that may include RAM devices, such as, for example, Dynamic RAM (DRAM) devices, flash memory devices, Static RANI (SRAM) devices, etc. Storage device 1903 may include a magnetic disk and/or optical disk and its corresponding drive for storing information and/or instructions. Memory 1902 and/or storage device 1903 may store class definitions.

Interconnect 1307 may include logic that operatively couples components of computing device 1900 together. For example, interconnect 1307 may allow components to communicate with each other, may provide power to components of computing device 1900, etc. In an embodiment of computing device 1900, interconnect 1307 may be implemented as a bus.

Input device 1904 may include logic configured to receive information for computing device 1900 from, e.g., a user. Embodiments of input device 1904 may include keyboards, touch sensitive displays, biometric sensing devices, computer mice, trackballs, pen-based point devices, etc. Output device 1905 may include logic configured to output information from computing device. Embodiments of output device 1905 may include cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc.

It should be noted that embodiments may be implemented using some combination of hardware and/or software. It should be further noted that a computer-readable medium that includes computer-executable instructions for execution in a processor may be configured to store embodiments of the invention. The computer-readable medium may include volatile memories, non-volatile memories, flash memories, removable discs, non-removable discs and so on. In addition, it should be noted that various electromagnetic signals such as wireless signals, electrical signals carried over a wire, optical signals carried over optical fiber and the like may be encoded to carry computer-executable instructions and/or computer data on e.g., a communication network for an embodiment of the invention.

A hardware unit of execution may include a device (e.g., a hardware resource) that performs and/or participates in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, in one implementation, a hardware unit of execution may include a single processing device that includes multiple cores, and in another implementation, the hardware unit of execution may include a number of processors 1301. A hardware unit of execution may also be a programmable device, such as a field programmable gate array (FPGA), an application specific integrated circuit (ASIC), a digital signal processor (DSP), etc. Devices used in a hardware unit of execution may be arranged in substantially any configuration (or topology), such as a grid, ring, star, etc. A hardware unit of execution may support one or more threads (or processes) when performing processing operations.

It should be understood, of course, that the foregoing relates to exemplary embodiments of the invention and that modifications may be made without departing from the spirit and scope of the invention as set forth in the following claims.

We claim:

1. A training system for objectively assessing mission readiness, the training system comprising:
   a backend system comprising:
      a planning and analysis component comprising planning data and assessing data for a first and second training mission;
      a common database builder comprising geospatial data of a geographical region for a participant in the first and second training mission, and
      a digital media replicator comprising a social media module configured to receive publically accessible social media data relevant to the first training mission and second training mission from an external source;
   a scenario server comprising an intelligence module and in communication with the backend system;
   a training server comprising an analysis module and in communication with the scenario server; and
   a computing device for a participant in the first training mission and second training mission,
   wherein the backend system, the scenario server and the training server are separate hardware components of the training system,
   wherein the planning and analysis component, the common database builder and the digital media replicator are separate hardware components of the backend system,
   wherein the scenario server is configured to receive the planning data from the planning and analysis system, the geospatial data from the common database builder, and the publically accessible data from the digital media replicator to create the first training mission,
   wherein the intelligence module is configured to learn from said first training mission and modify or update at least one portion of the first training mission to create the second training mission based on said first training mission including said modified or updated portion;

wherein the training server is configured to receive the first training mission and second training mission from the scenario server and to provide the first training mission and second training mission to the computing device, and wherein the analysis module is configured to determine a performance report of the participant in the first training mission or second training mission.

2. The training system of claim 1, additionally comprising:

capable of determining one or more biological properties of participant in the first training mission, with a biometric device in communication with the training server and the computing device.

3. The training system of claim 1, wherein the performance report includes at least one of:

progress of the participant in the first training mission or second training mission, and biometric properties of the participant in the first training mission or second training mission.

4. The training system of claim 1, wherein the performance report includes a performance indicator of at least one of a strength and a weakness of the participant in the first training mission or second training mission.

5. The training system of claim 1, wherein at least two participants in the first training mission or second training mission are located in different geographical regions.

6. The training system of claim 5, wherein the assessing data is based on the geographical region of the participants in the first and second training mission.

7. The training system of claim 5, wherein the common database builder is configured to receive geospatial data for the different geographical regions of the participants in the first training mission or second training mission.

8. The training system of claim 5, wherein the scenario server is configured to create the first training mission and second training mission for each role player based on the geospatial data of the geographical region of the participants.

9. The training system of claim 1, wherein the external source is a social media platform.

10. The training system of claim 1, wherein the digital media replicator comprises fictitious data.

11. The training system of claim 1, wherein the digital media replicator further comprises a news sites module capable of receiving data relevant to one the training mission from one or more news sites.

12. The training system of claim 1, wherein the intelligence module is also configured to permit one or more subject matter experts to manually input, modify, or update a part of the first training mission or second training mission.

13. The training system of claim 1, wherein the intelligence module is configured to automatically extract information from the training mission to learn from the first training mission and to perform the modifying or updating based on the extracted information.

* * * * *